US009185145B2

(12) United States Patent
Pirnazar

(10) Patent No.: US 9,185,145 B2
(45) Date of Patent: *Nov. 10, 2015

(54) METHOD AND APPARATUS FOR THE IMPLEMENTATION OF A REAL-TIME, SHARABLE BROWSING EXPERIENCE ON A GUEST DEVICE

(71) Applicant: Actual Worlds, Inc., Los Angeles, CA (US)

(72) Inventor: Kambiz David Pirnazar, Los Angeles, CA (US)

(73) Assignee: SAMESURF, INC., Beverly Hills, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/951,789

(22) Filed: Jul. 26, 2013

(65) Prior Publication Data

US 2013/0311664 A1 Nov. 21, 2013

Related U.S. Application Data

(63) Continuation of application No. 12/783,743, filed on May 20, 2010, now Pat. No. 8,527,591.

(51) Int. Cl.
*G06F 15/16* (2006.01)
*H04L 29/06* (2006.01)
*H04L 12/58* (2006.01)
*G06F 17/30* (2006.01)

(52) U.S. Cl.
CPC ...... *H04L 65/1069* (2013.01); *G06F 17/30873* (2013.01); *H04L 51/046* (2013.01); *H04L 51/32* (2013.01); *H04L 65/403* (2013.01)

(58) Field of Classification Search
CPC ... H04L 65/1069; H04L 51/32; H04L 51/046; H04L 65/403; G06F 17/30873
USPC .......................... 709/205, 203; 715/733, 753
See application file for complete search history.

(56) References Cited

U.S. PATENT DOCUMENTS

| 6,035,332 | A  | 3/2000  | Ingrassia et al. |
| 6,418,471 | B1 | 7/2002  | Shelton et al. |
| 7,062,465 | B1 | 6/2006  | Shafiee et al. |
| 7,287,054 | B2 | 10/2007 | Lee et al. |

(Continued)

OTHER PUBLICATIONS

"Why WebEx? Discover the benefits of real-time web collaboration in your organization." Cisco WebEx LLC. 2009.

*Primary Examiner* — Jungwon Chang
(74) *Attorney, Agent, or Firm* — Jafari Law Group, Inc.

(57) ABSTRACT

The present invention describes a method and apparatus for the implementation of a real-time, sharable web browsing experience on a guest device, utilizing the transfer of URL and form data information. The present invention further describes a method for joining a synchronized browsing session administered by a synchronization server, comprising activating a hyperlink associated with the synchronized browsing session, sending a request to join the synchronized browsing session to the synchronization server in response to the activation of the hyperlink, and joining the synchronized browsing session. The present invention further describes a method for implementing a synchronized browsing session, comprising receiving information related to a shared web browsing interaction performed by a host device from a synchronization server, and performing the shared web browsing interaction based on the information received from the synchronization server.

18 Claims, 20 Drawing Sheets

(56) References Cited

U.S. PATENT DOCUMENTS

| | | |
|---|---|---|
| 7,533,146 B1 | 5/2009 | Kumar |
| 7,991,740 B2 | 8/2011 | McCarthy et al. |
| 8,527,591 B2 * | 9/2013 | Pirnazar ................ 709/205 |
| 2002/0073152 A1 | 6/2002 | Andrew |
| 2002/0083134 A1 | 6/2002 | Bauer, Jr. et al. |
| 2003/0041108 A1 * | 2/2003 | Henrick et al. ........... 709/205 |
| 2004/0100507 A1 | 5/2004 | Hayner |
| 2005/0097107 A1 | 5/2005 | Burt |
| 2005/0108330 A1 * | 5/2005 | Sakaguchi et al. ........ 709/205 |
| 2005/0114789 A1 | 5/2005 | Chang et al. |
| 2005/0138122 A1 * | 6/2005 | Boehringer et al. ....... 709/205 |
| 2005/0160141 A1 | 7/2005 | Galley et al. |
| 2005/0198162 A1 | 9/2005 | Bauer, Jr. et al. |
| 2006/0089978 A1 | 4/2006 | Lee et al. |
| 2006/0129642 A1 | 6/2006 | Qian et al. |
| 2007/0250841 A1 | 10/2007 | Scahill et al. |
| 2008/0028323 A1 | 1/2008 | Rosen et al. |
| 2008/0289029 A1 | 11/2008 | Kim |
| 2008/0301562 A1 * | 12/2008 | Berger et al. ............ 715/733 |
| 2009/0044216 A1 | 2/2009 | McNicoll |
| 2009/0158163 A1 | 6/2009 | Stephens et al. |
| 2009/0164581 A1 * | 6/2009 | Bove et al. .............. 709/205 |
| 2009/0228798 A1 | 9/2009 | Kephart et al. |
| 2009/0241037 A1 | 9/2009 | Hyndman |
| 2009/0249216 A1 | 10/2009 | Charka et al. |
| 2010/0037153 A1 | 2/2010 | Rogers |
| 2010/0082747 A1 | 4/2010 | Yue et al. |
| 2010/0191799 A1 * | 7/2010 | Fiedorowicz et al. ....... 709/203 |

* cited by examiner

From: John@sharebrowsing.com
To: Bob@internet.com

Subject: Sync. Browsing Session

Bob,

John has invited you to a Synchronized Browsing Session.
To join, click on the following hyperlink:

http://www.synchronizedbrowsing.com/sessionid/3748923759328875932759.htm

52

METHOD AND APPARATUS FOR THE IMPLEMENTATION OF A REAL-TIME, SHARABLE BROWSING EXPERIENCE ON A GUEST DEVICE

PRIORITY NOTICE

The present application claims priority under 35 U.S.C. §119(e) to U.S. Nonprovisional patent application Ser. No. 12/783,743 filed on May 20, 2010, the disclosure of which is incorporated herein by reference in its entirety.

TECHNICAL FIELD OF THE INVENTION

The present invention relates in general to a sharable browsing experience, and more specifically, to a method and apparatus for the implementation of a synchronized browsing session on a guest device utilizing the transfer of URL, form data, script, and other information.

COPYRIGHT & TRADEMARK NOTICE

A portion of the disclosure of this patent application may contain material that is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

BACKGROUND OF THE INVENTION

The demand for social networking on the internet has resulted in an exponentially expanding number of social internet websites, applications, and other social network media. Internet websites such as FACEBOOK®, TWITTER®, and MYSPACE® have experienced rapid expansion as users attempt to post and share much of their lives and experiences online. In addition, online commerce shopping sites such as Amazon and EBay are now dominant entities in the field of online and mainstream commerce.

While the explosion of social media has allowed people to be connected on the internet more than ever before, browsing the internet has remained a largely solitary experience. Users of social media websites or applications communicate by taking turns, posting information rather than communicating with one another in real time. While real time internet communication methods such as internet telephone, video conferencing and chat rooms do exist, usage of these methodologies is limited by the applications or platforms that support them. For instance, chat software allows users to send messages back and forth, but users are typically limited to this simple exchange within the confines of that technology.

There exists a wealth of internet experiences that cannot be easily and effectively shared, viewed, or fully interacted with in real time by all of the parties who are or would like to share that content. Activities such as viewing pictures, watching video, or engaging in internet shopping cannot currently be experienced in a simple, real time, and fully interactive method that enables two or more users who are connected on separate devices to all interact with and discuss that content simultaneously without having to take turns passing controls.

In addition, there is no modality that enables all of the two or more users engaged in a synchronized or shared browsing session to (1) click on web links which open in new non-shared tabs, (2) log into and register at certain web sites separately, and/or (3) input form data or other information at the site or application in a simultaneous or nearly simultaneous manner. As such, the current art lacks technology that would simultaneously connect two or more users in a medium that would allow all of them to both interact with one another and with the content itself in real time and in a synchronized or shared fashion.

Despite the obvious demand for socialization on the internet and despite the desire of many users to utilize the web to view online content with others in real-time, there is no effective, fully interactive modality that enables a group of users to view and interact with internet content and media simultaneously with others on different computers or other connected devices with all of those users empowered to interact with that content in real-time on a simultaneous basis. Furthermore, there is no such modality that allows all users in a shared session to simultaneously log in or register into a certain web site, application, or experience with either or all of (1) their own credentials; (2) credentials passed to them by the host; (3) or with no log in credentials whatsoever. While some current methods such as "desktop or screen sharing" allow users to simply view the same internet content, these methods do not enable all users in a session to click, input, and log into those experiences in a simultaneous or nearly simultaneous manner. Furthermore, these methods are also less appealing because they work by broadcasting continuous screenshots of the host screen in large files or packets and require high levels of bandwidth and computer processing power. As a result of their high bandwidth and processing power requirements, current methods such as desktop sharing are inadequate for enabling larger groups to all view and fully interact with that interactive content in a simultaneous manner. Finally, current methods such as "desktop or screen sharing" afford little protection for the broadcasting host's private information since all participants in a particular session see the host screen as s/he enters sensitive information such as user names or passwords or when the host toggles back and forth in other areas on their desktop.

There is a need in the art for an internet enabled collaboration, online commerce, and social networking innovation that facilitates real time sharing of a more complete internet experience. Specifically, there is a need for a device that allows all users in a session to interact with, discuss, log in separately or together, and share internet browsing in real time for online activities such as shopping together, booking travel together, watching or listening to media together, and browsing the internet together in a simultaneous fashion from different devices and/or locations. It is to these ends that the present invention has been developed.

SUMMARY OF THE INVENTION

To minimize the limitations in the prior art, and to minimize other limitations that will be apparent upon reading and understanding the present specification, the present invention describes a method for joining a synchronized browsing session administered by a synchronization server, comprising activating a hyperlink associated with the synchronized browsing session, sending a request to join the synchronized browsing session to the synchronization server in response to the activation of the hyperlink, and joining the synchronized browsing session.

The present invention further describes an apparatus for joining a synchronized browsing session administered by a synchronization server, comprising a network interface adapted to communicate with the synchronization server, and a processor adapted to activate a hyperlink associated with the synchronized browsing session, send a request to join the synchronized browsing session to the synchronization server via the network interface, in response to the activation of the hyperlink, and join the synchronized browsing session.

The present invention further describes a method for implementing a synchronized browsing session, comprising receiving information related to a shared web browsing interaction performed by a host device from a synchronization server, and performing the shared web browsing interaction based on the information received from the synchronization server.

The present invention further describes an apparatus for implementing a synchronized browsing session, comprising a network interface adapted to communicate with a synchronization server, and a processor adapted to receive information from the synchronization server related to a shared web browsing interaction performed by a host device, and perform the shared web browsing interaction based on the information received from the synchronization server.

It is an objective of the present invention to enhance social and personal internet communication and commercial and non-commercial activity by enabling users to invite and interact with one another while browsing the internet together in real time. As a result and as an illustrative list only, synchronized online activities such as shopping together, booking travel together, watching media together, and browsing the internet together in real time from different devices and/or locations will be supported for all participants in a simultaneous or nearly simultaneous fashion.

It is another objective of the present invention to enable users to communicate via (1) voice; (2) chat; (3) video conferencing; and (4) desktop sharing (via a small browser frame on each participant's screen that monitors the host path) as they browse the internet together in real time.

It is another objective of the present invention to enable users to detect when their friends or other designated users are connected to the internet or when they are logged into certain chat and specialty sites such as FACEBOOK®, GMAIL®, or YAHOO MESSENGER® in order to simplify and streamline the invitation process into a synchronized browsing session and to allow session participants or users of the invention to chat with friends who are not currently within the synchronized browsing session.

Finally, it is yet another objective of the present invention to provide a social networking, lead/visitor generation, promotional, and online commerce device that internet sites, virtual worlds, games and applications can use to increase their value, viewership, or purchasing or activity oriented conversion rates as a result of real-time referrals by current visitors to those sites or applications to invitees who may share common demographics, friendships, and/or affinities for that site's content or offerings.

These and other advantages and features of the present invention are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 4(b) illustrates an exemplary embodiment of the visual output on an invited device for the acceptance of a synchronized browsing session invitation message through an email.

DETAILED DESCRIPTION OF THE DRAWINGS

Figure 1A:
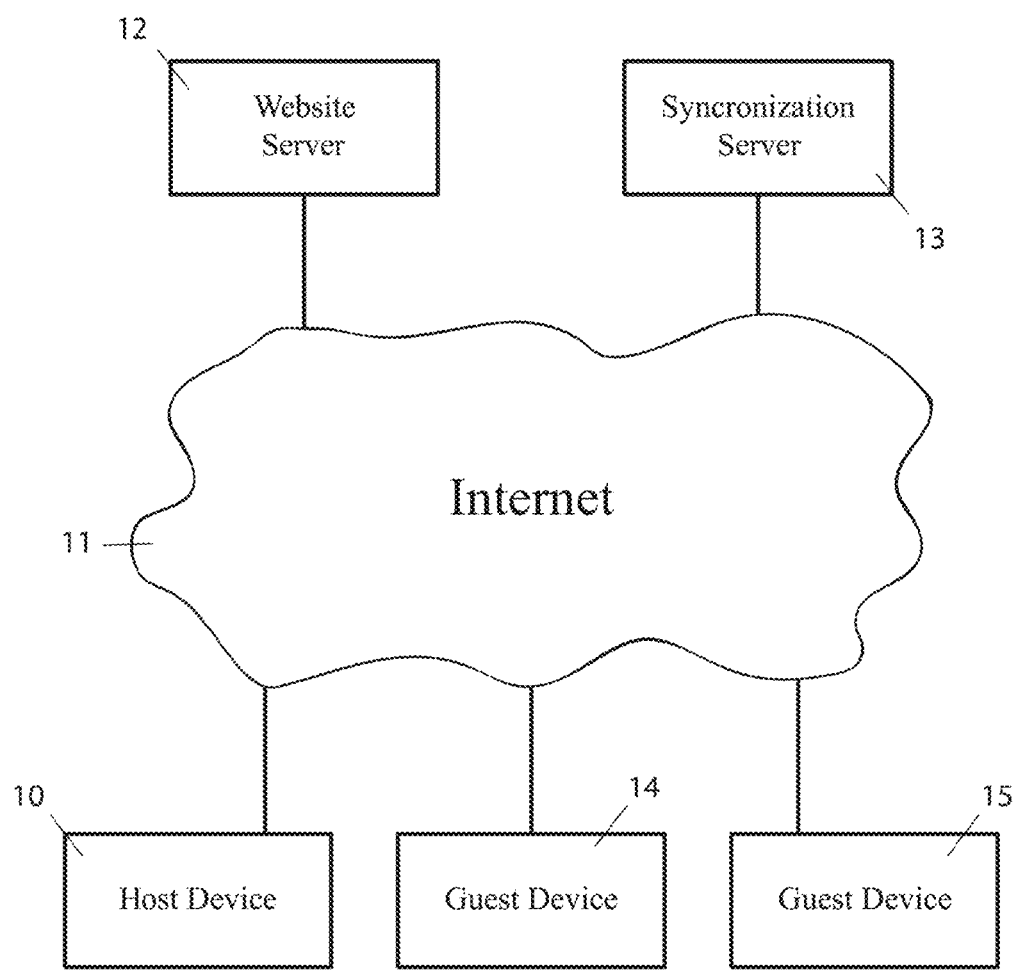
FIG. 1(a) illustrates a block diagram of the components of an exemplary embodiment of the present invention for initializing and conducting a synchronized browsing session.

In the following discussion that addresses a number of embodiments and applications of the present invention, reference is made to the accompanying drawings that form a part hereof; these depictions are made by way of illustration and of specific embodiments in which the invention may be practiced. It is to be understood that other embodiments may be utilized and changes may be made without departing from the scope of the present invention.

The present invention allows two or more persons browsing the internet to share their internet browsing experience and have all users simultaneously browse and fully interact with web sites, games, virtual worlds, or other online applications in real time. To share their internet browsing experience, the present invention utilizes the passing of certain data such as URL information, form data, scripts (including java script), cookies, or other types of data information between browser clients. In a synchronized browsing session, two or more people may read the same article, watch the same video, or shop for the same item automatically, without the hassle of coordinating user input. Furthermore, utilization of the present invention does not materially impose more bandwidth or processing power requirements than simply browsing the internet using standard, conventional methods.

In the current art, should two or more people, on different devices, attempt to book an airline flight through an internet website, each person would be separately required to input identical information such as destination, date of departure, or date of arrival into their respective browser. Coordination of such data input is often difficult to accomplish and input errors can lead to conflicting search results. In a synchronized browsing session utilizing the present invention, however, such data input is automatically formatted, forwarded and inputted into the other devices, thereby allowing all persons to view, book, and alter the same flight results. Further activities may include, but are not limited to, enabling session attendees to shop, book travel, view or listen to media, chat, audio and video conference, screen share, screen draw, stay connected to contacts in order to send invites and chat with those not currently in the experience, detect online friends, and otherwise browse and fully interact in a shared browsing experience. As such, utilization of the present invention facilitates the initialization and implementation of a synchronized browsing session between two or more internet users, thereby allowing all of them to view and fully interact with the same internet content without the hassle of coordinated user input. For purposes of this discussion, the term, "fully interact with" may comprise, but is not limited to: (1) logging into or registering at certain sites or applications; (2) filling in form data; (3) performing multiple queries; (4) having following participants click on links that open in new non-shared tabs; (5) playing online games; (6) visiting virtual worlds; or (7) "drawing" on the screen and simultaneously transmitting those figures, annotations, or markups to other users in the session.

FIG. 1(a) illustrates a block diagram of the components of an exemplary embodiment of the present invention for initializing and conducting a synchronized browsing session. FIG. 1(a) illustrates host device 10, internet 11, website server 12, synchronization server 13, and exemplary guest devices 14 and 15. In exemplary embodiments of the present invention, host device 10 may establish a synchronized browsing session with guest devices 14 and 15 via synchronization server 13. In an exemplary synchronized browsing session, host device 10 may forward website interaction information with website server 12 to synchronization server 13, which may relay the website interaction information to guest devices 14 and 15 for the recital of a synchronized browsing session.

Host device 10 is a component of the present invention that may initialize and conduct a synchronized browsing session with guest device 14 via synchronization server 13. In an exemplary embodiment of the present invention, host device 10 may comprise a personal computer, mobile phone, Smartphone, IPAD®, or other type of electronic device with a visual user interface and a network connection such that a user may access and view a third party website such as one provided by website server 12 over internet 11.

Guest devices 14 and 15 are components of the present invention that may join a synchronized browsing session to view internet browsing conducted by host device 10 via relay communication over synchronization server 13. Like host device 10, guest devices 14 and 15 may comprise a personal computer, mobile phone, Smartphone, IPAD®, or other type of electronic device with a visual user interface and a network connection such that a user may access and view an internet website such as one provided by website server 12 over internet 11.

During a synchronized browsing session, data communications sent by host device 10 to website server 12 is forwarded to synchronization server 13 in order to provide for synchronized browsing with guest devices 14 and 15. In exemplary embodiments of the present invention, prior to relaying the data communications to guest devices 14 and 15, synchronization server 13 may analyze the data communications received from host device 10, see FIG. 1(e) and later discussion, to determine if there is an advertising partnership or other monetization deal ("advertising deal"), such as those related to revenue sharing, lead origination, affiliation, cost per action, cost per click, or cost per impression, with the website hosted on website server 12. If an advertising deal exists with the website hosted on website server 12, synchronization server 13 will then update the data communication for relay to guest devices 14 and 15, and transmit an updated data communication back to host device 10. This process will be discussed in more detail within FIG. 1(e) and FIG. 5(d).

Synchronization server 13 may then forward the data communication to guest devices 14 and 15. In an exemplary embodiment of a synchronized browsing session, once data communication is forwarded to guest devices 14 and 15 from host device 10 via synchronization server 13, guest devices 14 and 15 will transmit the same data communication to website server 12, such that the communication sent is identical to communication sent to website server 12 by host device 10. As such, guest devices 14 and 15 should receive the same or similar data response from website server 12 as that received by host device 10 from website server 12.

In alternative embodiments of the present invention, a synchronized browsing session may be conducted by more than one device. In such embodiments, webpage interactions performed by any controlling party will be forwarded to the other attendees in the synchronized browsing session. As such, a leading device, such as host device 10, may be defined as a device that possesses control within the synchronized browsing session, wherein webpage interactions performed by the leading device within shared browsing window 17 are forwarded to synchronization server 13. In yet other embodiments of the present invention, control within the synchronized browsing session may be passed from one attending device to another.

A following device, such as guest device 14, may be defined as any device that receives relayed webpage interactions from synchronization server 13. In exemplary embodiments, relayed webpage interactions may include data such as URL, form data, scripts, advertising codes, or other information. A following device that does not possess leading device control within the synchronized browsing session may not forward or relay webpage interactions to synchronization server 13 unless the ability to do so is conferred upon the following device by a leading device or other authoritative party for either a full session or for a certain period of time.

In such various embodiments, a device in a synchronized browsing session may possess leading, following, or both leading and following characteristics. For example, in an embodiment wherein both host device 10 and guest device 14 are both leading and following devices, any webpage interaction performed by guest device 14 within the shared browsing window will be relayed to host device 10, and any webpage interaction performed by host device 10 within the shared browsing window will be relayed to guest device 14. In such an embodiment, any relayed webpage interactions will necessitate webpage requests to be sent to a webpage server, such as website server 12.

Figure 1B:
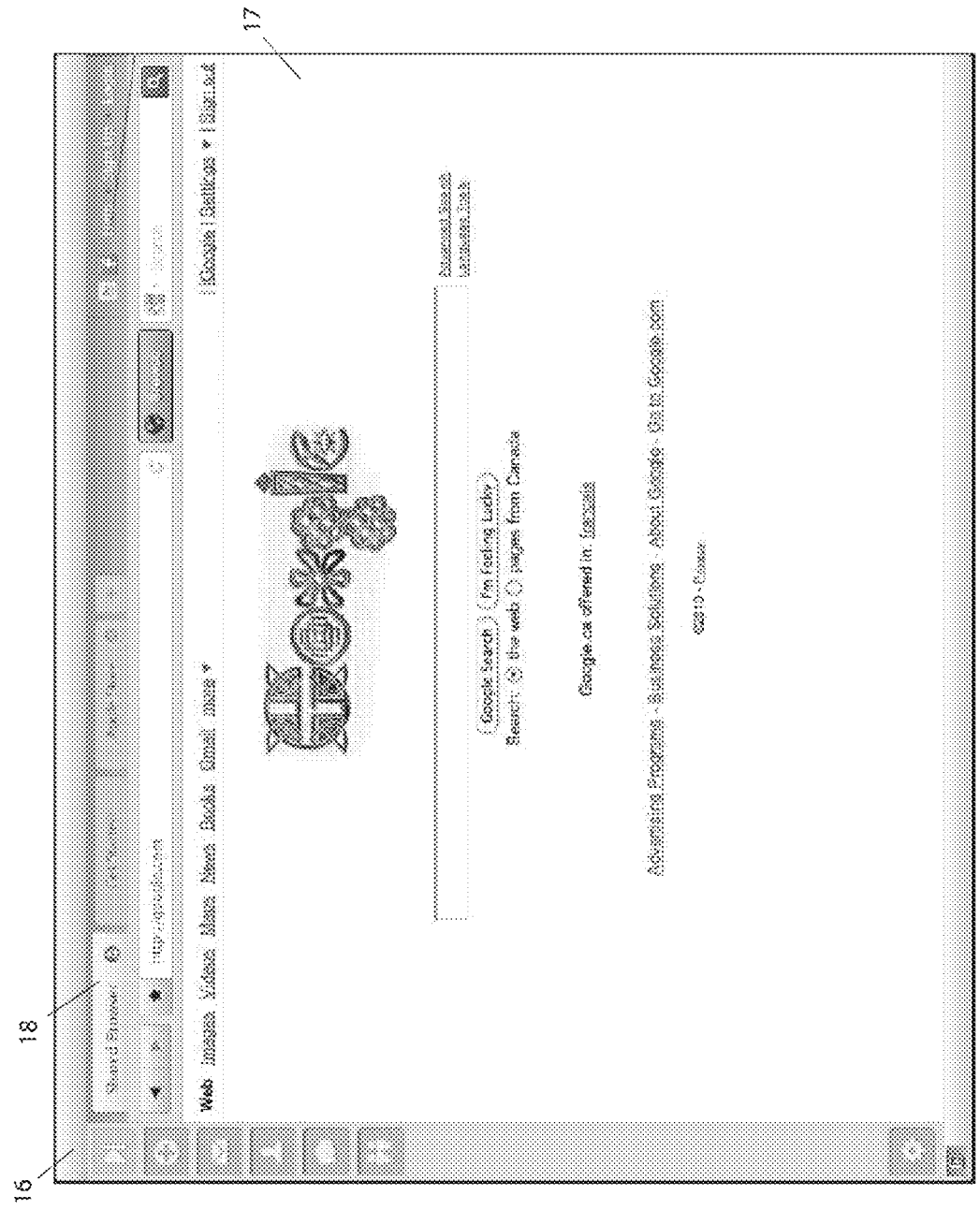
FIG. 1(b) illustrates a screen shot of an exemplary embodiment of the synchronized browsing software during a synchronized browsing session.

FIG. 1(b) illustrates a screen shot of an exemplary embodiment of the synchronized browsing software during a synchronized browsing session. FIG. 1(b) illustrates the visual output of host device 10 running synchronized browsing software 16, wherein synchronized browsing software 16 comprises shared browsing window 17 and shared browsing tab 18. In an exemplary synchronized browsing session, the visual and audio output of shared browsing window 17 on a following device, such as guest device 14, will be similar, if not identical, to the visual and audio output of shared browsing window 17 on a leading device, such as host device 10.

In exemplary embodiments, synchronized browsing software 16 is designed to run on a computer or other electronic device, such as host device 10 or guest device 14, in order for the user of the device to participate in a synchronized browsing session. Synchronized browsing software 16 may incorporate internet browsing software functionality on the existing device, such as INTERNET EXPLORER®, SAFARI®, CHROME®, FIREFOX®, or WEBKIT® to browse the internet. In such embodiments, synchronized browsing software 16 may integrate the native browser control components of commonly used web browsers such as INTERNET EXPLORER® into the software user interface for PC computers, or may integrate the native browser control components of the SAFARI® or WEBKIT® web browsers for the software user interface on APPLE® or MAC® computers. Some or all of these components may be pre-installed on the PC and APPLE® computers, respectively.

In other embodiments of the present invention, synchronized browsing software 16 may comprise an add-on or plug-in to commonly used internet browsing software such as INTERNET EXPLORER®, FIREFOX®, CHROME® or SAFARI®. In further embodiments, synchronized browsing software 16 may comprise independent functionality to browse the internet.

Shared browsing window 17 is an element of synchronized browsing software 16 wherein the webpage interactions of host device 10, or other leading device, are relayed to following devices in the synchronized browsing session, such as guest device 14. In exemplary embodiments, the audio and visual output of shared browsing window 17 may be similar or identical on both leading and following devices. Alternatively, if one or more users have already registered with a particular site or application and certain personalization settings are triggered, that particular user will receive a similar data response that also includes the output of the personalized settings that were set by that particular user.

In exemplary usage of the present invention, the user of guest device 14 views the same display of internet content as that displayed to the user of host device 10. In alternative embodiments, the user of guest device 14 may view similar internet content as that displayed to user of host device 10, with slight modifications due to personalization settings that may be triggered for the user of guest device 14 at that site or application due to prior, recent, or simultaneous website registration. In situations where screen size or screen resolution of guest device 14 is different than that of host device 10, the user of guest device 14 should view a similar display of internet content as what is displayed to host device 10, with modifications due to screen size and resolution.

Shared browsing tab 18 is a browsing tab identifier and extension of shared browsing window 17. In exemplary usage, a user of synchronized browsing software 16 may click on shared browsing tab 18 in order to switch from another window into shared browsing window 17. Clicking unshared browsing tab 70 may switch a user from shared browsing window 17 into an unshared browsing window.

In exemplary embodiments of the present invention, a variety of internet content and media may be shared between attendees of a synchronized browsing session. Textual articles, images, music, streaming video, e-commerce sites, games, documents for review or download, or any form of web-based content may be activated by a leading device, to be relayed by synchronization server 13, and on to following devices within the synchronized browsing session.

In alternative embodiments, synchronized browsing software 16 may provide or integrate desktop sharing functionality, wherein following devices may view the screen of a leading device. For example, if host device 10, the sole leading device, enabled desktop sharing, guest device 14, a following device, would be able to see the screen of host device 10, or a portion thereof. In other embodiments, desktop sharing may be enabled in small windows that may occupy or overlay upon a portion of shared browsing window 17.

Figure 1C:
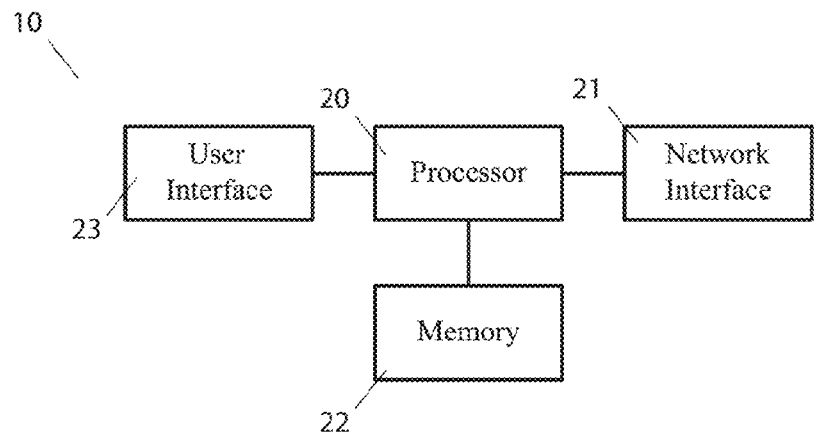
FIG. 1(c) illustrates a block diagram of the components of an exemplary leading device.

FIG. 1(c) illustrates a block diagram of the components of an exemplary leading device. FIG. 1(c) illustrates host device 10, comprising processor 20, network interface 21, memory 22 and user interface 23. Host device 10 is designed to initialize and conduct a synchronized browsing session with guest device 14 via synchronization server 13

Processor 20 is a component of host device 10 adapted to perform and process web page interactions and communications with synchronization server 13 in order to initialize and host a synchronized browsing session.

Network interface 21 is a component of host device 10 designed to transmit and receive data communication with external electronic devices. In exemplary embodiments of the present invention, processor 20 may utilize network interface 21 to perform web page interactions, such as with website server 12, and to communicate with synchronization server 13.

Host device 10 may also utilize memory 22 and user interface 23. Memory 22 may be adapted to store one or more software modules for controlling processor 20. Alternatively, memory 22 may be adapted to store one or more software modules for output via user interface 23. User interface 23 may be adapted to receive a user input for initiation of processor 20, prompting data communication via network interface 21. In other embodiments, webpage interactions may be outputted to the user of host device 10 via user interface 23.

Figure 1D:
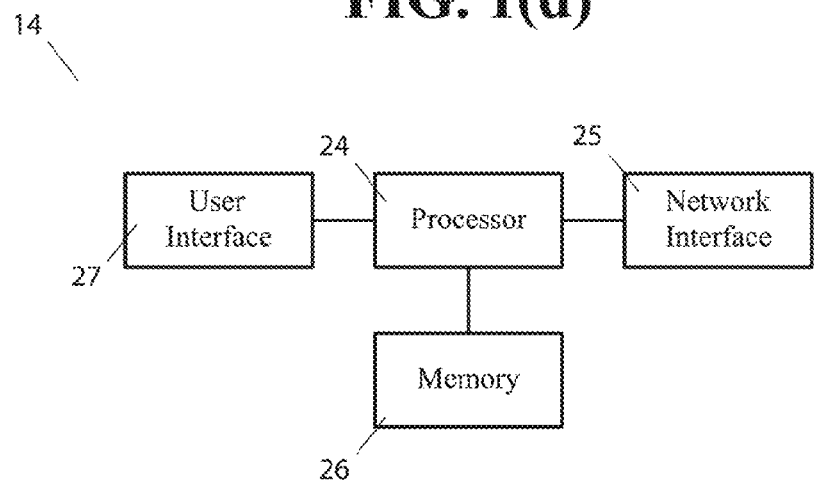
FIG. 1(d) illustrates a block diagram of the components of an exemplary following device.

FIG. 1(d) illustrates a block diagram of the components of an exemplary following device. FIG. 1(d) illustrates guest device 14, comprising processor 24, network interface 25, memory 26 and user interface 27. Guest device 14 is designed to join and implement a synchronized browsing session.

Processor 24 is a component of guest device 14 that may utilize network interface 25, memory 26 and user interface 27 to join and implement a synchronized browsing session with host device 10. In exemplary embodiments, processor 24 may utilize network interface 25 to receive and transmit communication with synchronization server 13. Processor 24 may also utilize network interface 25 to perform webpage interactions, such as transmit requests to website server 12.

Guest device 14 may also utilize memory 26 and user interface 27. Memory 26 may be adapted to store one or more software modules for controlling processor 24, or for the output of webpage interactions via user interface 27. User interface 27 may be adapted to output webpage interactions to the user of guest device 14 via user interface 27. Alternatively, user interface 27 may be adapted to receive user input for initiation of processor 24, prompting data communication via network interface 25.

Figure 1E:
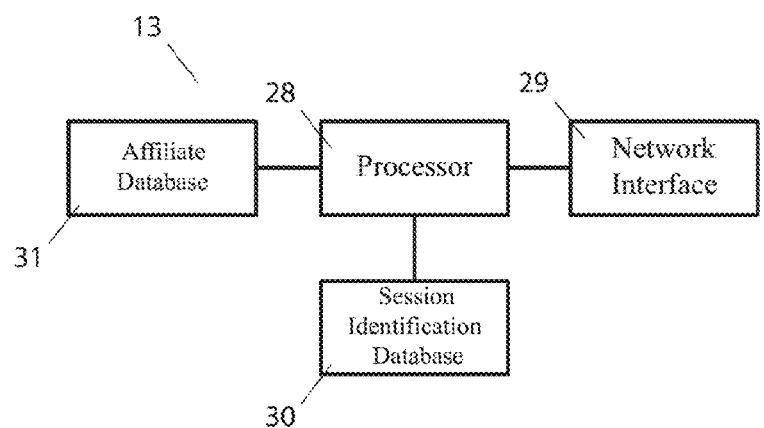
FIG. 1(e) illustrates a block diagram of the components of an exemplary synchronization server.

FIG. 1(e) illustrates a block diagram of the components of an exemplary synchronization server. FIG. 1(e) illustrates synchronization server 13, comprising processor 28, network interface 29, session identification database 30, and affiliate database 31. Synchronization server 13 is designed to establish and facilitate a synchronized browsing session between host device 10 and guest device 14.

Processor 28 is a component of synchronization server 13 that may utilize network interface 29, session identification database 30 and affiliate database 31 in order to establish and facilitate a synchronized browsing session between host device 10 and guest device 14. In exemplary embodiments, network interface 29 may both transmit and receive communication from host device 10 and guest devices, such as guest device 14.

Session identification database 30 may be utilized by processor 28 for the storage of information related to the establishment and facilitation of a synchronized browsing session, which may include a synchronized browsing session identifier 19, to be described later, routing information related to a lead device such as host device 10, or routing information related to one or more of the following devices, such as guest device 14. In exemplary embodiments of the present invention, should synchronization server 13 receive a request to establish a synchronized browsing session from host device 10, processor 28 may assign the synchronized browsing session a unique session identifier, referred to as synchronized browsing session identifier 19, and store identification information for host device 10, along with session identifier 19, within session identification database 30.

In an exemplary embodiment, when synchronization server 13 receives website interaction information during synchronized browsing session from host device 10 via network interface 29, processor 28 may utilize affiliate database 31 to determine if an affiliation, advertising or partnership agreement exists with the website hosted by website server 12. For example, should website information sent from host device 10 include a URL comprising http://www.uspto.gov, processor 28 may determine if a partnership exists with said website by searching affiliate database 31.

If processor 28 determines that a partnership exists, processor 28 may update the webpage interaction information and utilize network interface 29 to relay the updated website interaction information to host device 10 and guest device 14. In alternative embodiments, network interface 29 may only transmit an adcode, cookies, scripts, XML, or other unique identifier signifying the website affiliation to host device 10. If processor 28 determines that a partnership does not exist with the website hosted by website server 12, then no update or update transmission is necessary.

Figure 2A:
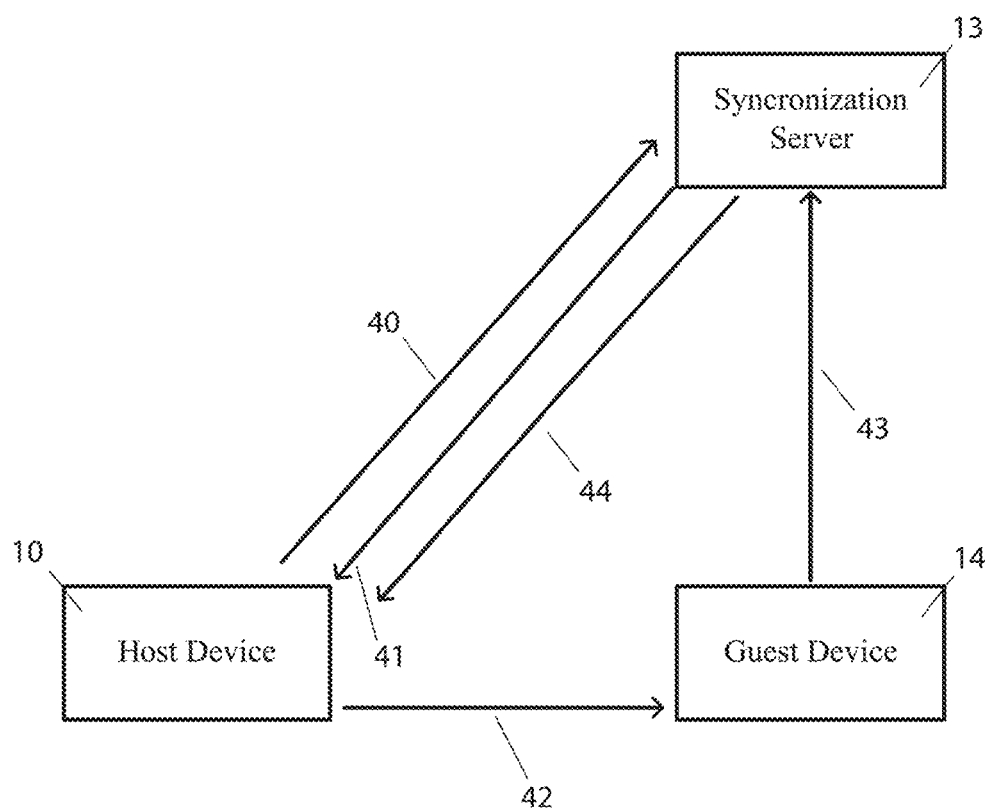
FIG. 2(a) illustrates a block diagram of exemplary data communication transferred between exemplary components of the present invention to initialize a synchronized browsing session.

FIG. 2(a) illustrates a block diagram of exemplary data communication transferred between components of the present invention to initialize a synchronized browsing session. FIG. 2(a) shows host device 10, synchronization server 13 and guest device 14 transmitting data communication to initialize a synchronized browsing session between host device 10 and guest device 14.

To initialize a synchronized browsing session, host device 10 transmits initialization request 40 to synchronization server 13. In response to initialization request 40, synchronization server 13 may transmit confirmation message 41 to host device 10, including session identifier 19 (not shown). In exemplary embodiments, session identifier 19 may comprise an identification number, passkey, URL, MAC address, or other unique indicator such that the synchronized browsing session may be identified for joining the session.

Once the synchronized browsing session is established and session identifier 19 is transferred to host device 10, host device 10 may transmit session invitation 42 to prospective guest devices, such as guest device 14. In other embodiments of the present invention, other session attendees may transmit session invitation 42 to additional prospective guests. Session invitation 42, to be described in detail below for discussion of FIG. 2(b), may comprise an invitation hyperlink 52 (to be described and illustrated in FIGS. 4(a)-4(e)) and session identifier 19.

Should the user of guest device 14 decide to join the synchronized browsing session hosted by host device 10, guest device 14 transmits request to join 43 to synchronization server 13. Request to join 43 is a data communication sent to synchronization server 13 by a prospective guest device that comprises session identifier 19.

After synchronization server 13 receives request to join 43 from guest device 14, synchronization server 13 records identification and routing information of guest device 14, such as IP address, MAC address, or other unique identifiers, in order to relay information in the synchronized browsing session to guest device 14. In exemplary embodiments, synchronization server 13 may then transmit notification 44 to host device 10, informing host device 10 that guest device 14 has joined the synchronized browsing session.

Figure 2B:
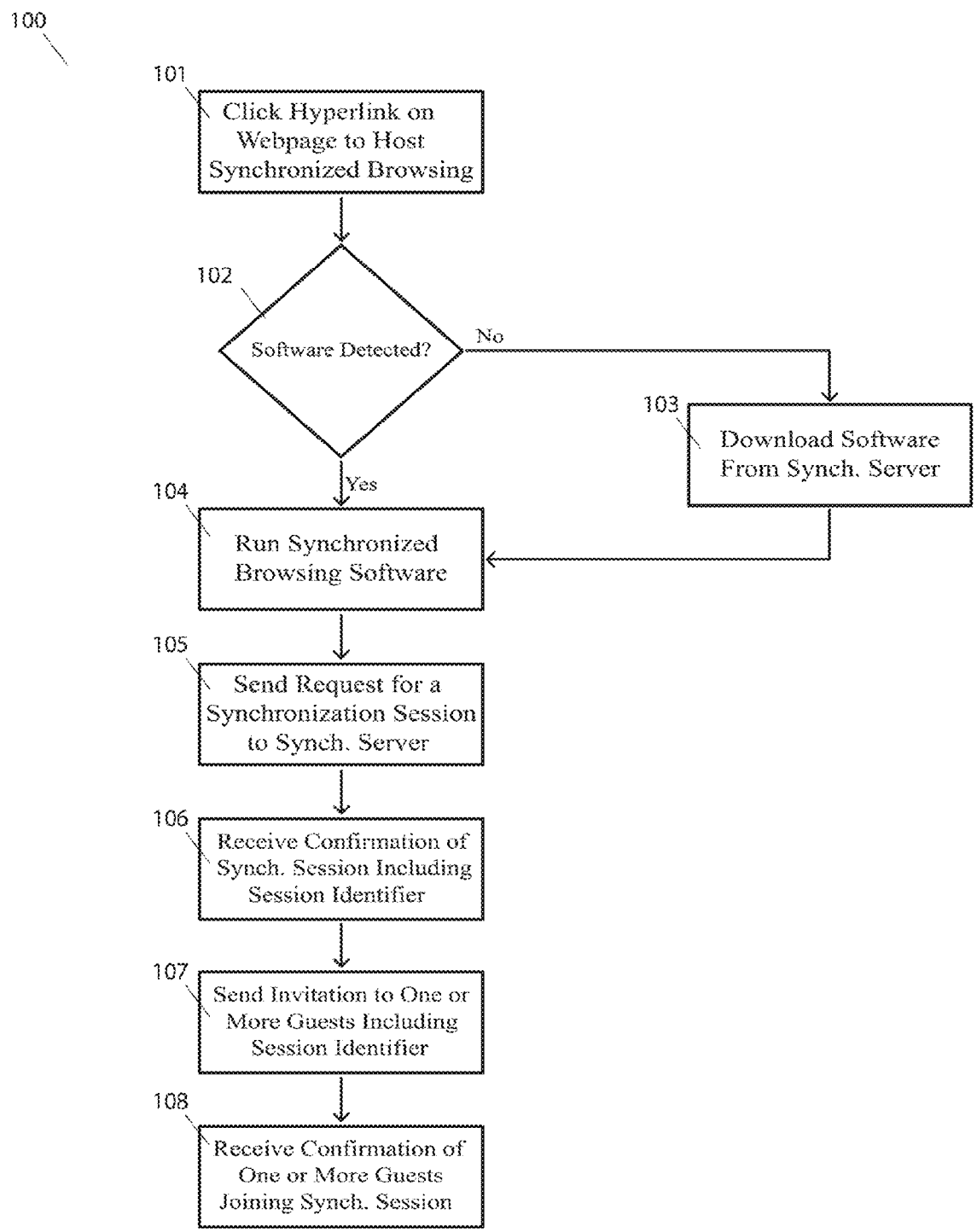
FIG. 2(b) illustrates a flow chart of a method utilized by a host device for the initialization of a synchronized browsing session.

FIG. 2(b) illustrates a flow chart of method 100 utilized by host device 10 for the initialization of a synchronized browsing session after the activation of a third party hyperlink from a website hosted by website server 12. Method 100 is utilized by host device 10 to initialize a synchronized browsing session with guest device 14 through synchronization server 13. Method 100 is explained in the order shown in FIG. 2(b); however, the following steps may be taken in any other conceivable sequence without deviating from the scope of the present invention. Additionally, alternative embodiments of the present invention may not require the software download and acceptance process.

Figure 2C:
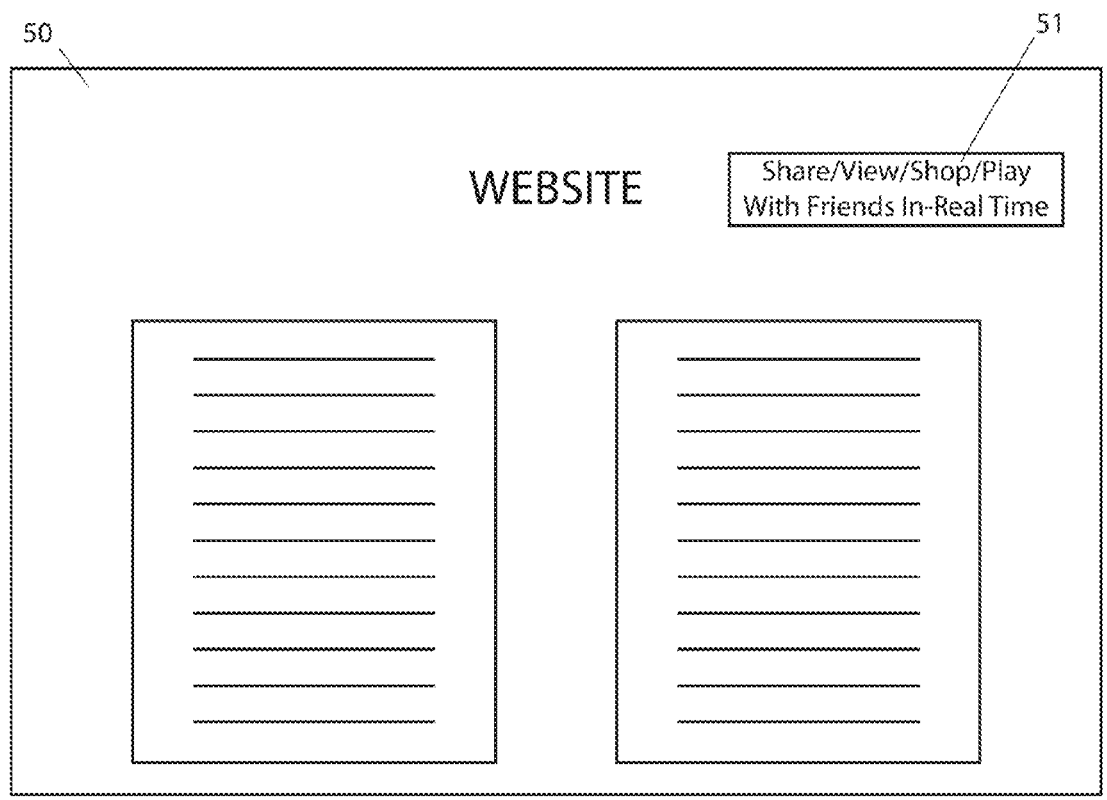
FIG. 2(c) illustrates an exemplary embodiment of the visual output on a host device of a third party website including a synchronization session activation hyperlink.

In step 101, host device 10 activates activation hyperlink 51, illustrated in FIG. 2(c), from a website hosted by website server 12. In step 102, host device 10, in response to the activation of activation hyperlink 51, attempts to detect if synchronized browsing software 16 is installed or ready to launch or run on host device 10. If the synchronized browsing software 16 is not detected on host device 10, host device 10 proceeds to step 103. If, however, synchronized browsing software 16 is detected, host device 10 proceeds to step 104.

In step 103, host device 10 sends a communication to synchronization server 13 requesting to download synchronized browsing software 16. In exemplary embodiments, synchronization server 13 transmits synchronized browsing software 16 to host device 10. In embodiments wherein synchronized browsing software 16 need to be installed in order for the software to run, host device 10, upon complete reception of the software, installs synchronized browsing software 16. Once the software is installed, host device 10 proceeds to step 104. In embodiments wherein synchronized browsing software 16 does not need to be installed, once the download is completed, host device 10 proceeds to step 104.

In step 104, host device 10 launches synchronized browsing software 16. In embodiments of the present invention wherein synchronized browsing software 16 comprises an add-on or plug-in to commonly used internet browsing software, then the add-on or plug-in is initialized.

In alternative embodiments of the present invention, a user of host device 10 may launch synchronized browsing software 16 directly, without the activation of activation hyperlink 51. In such embodiments, once the software is activated or launched, host device 10 begins at step 105. In such situations where host device 10 does not activate activation hyperlink 51, but host device 10 does not have synchronized browsing software 16 installed or ready to launch, host device 10 may contact synchronization server 13 and begin the process at step 103.

In step 105, host device 10 sends initialization request 40 to synchronization server 13. In step 106, host device 13 receives confirmation message 41 from synchronization server 13, indicating that a synchronized browsing session has been established. In exemplary embodiments, confirmation message 41 transmitted to host device 10 comprises session identifier 19.

In step 107, host device 10 sends session invitation 42 to one or more prospective guests, such as guest device 14, to join the synchronized browsing session. In exemplary embodiments, session invitation 42 may comprise session identifier 19, and invitation hyperlink 52 to join the synchronized browsing session. The prospective guests need to simply click invitation hyperlink 52 included in session invitation 42 to join the synchronized browsing session. In other embodiments, session invitation 42 may also comprise an image or message from the user of host device 10 to the user of the prospective guest device.

In exemplary embodiments of the present invention, session invitation 42 to join a synchronized browsing session may be sent to, or received by, a prospective guest device, such as guest device 14, in numerous ways. In one embodiment, session invitation 42 may be set by host device 10 to prospective guests via an email message. In another embodiment of the present invention, session invitation 42 may be sent to prospective guests via an instant message communication. In yet other embodiments of the present invention, session invitation 42 may be sent to prospective guests via a social networking communication. Exemplary methods of sending session invitation 42 are illustrated and in FIGS. 4(*b*)-4(*e*).

Alternatively, session invitation 42 may be displayed publicly or semi-privately on a website for viewers to click or activate. In such embodiments, session invitation 42 is not sent to one or more designated prospective guests, but rather is publicly displayed on a website so that anyone who views the invitation can activate it to enter into the synchronized browsing session. For example, should the user of host device 10 "tweet" an invitation to join a synchronized browsing session through the social communication website TWITTER®, any reader may accept the invitation by clicking on the shared hyperlink. In other embodiments, a user of host device 10 may post a public invitation through FACEBOOK®, GOOGLE® BUZZ, a website newsfeed, or as a hyperlink on a website, game, virtual world, or other application, in order to issue an open invitation to certain friends or the public to join their synchronized browsing session.

Finally, in step 108, host device 10 receives notification message 44 from synchronization server 13 that one or more guest devices have joined the synchronized browsing session. In an exemplary embodiment, host device 10 receives notification message 44 for each guest device, such as guest device 14, that has joined the synchronized browsing session. In such an embodiment, notification message 44 may comprise a visual, audio, or textual output through host device 10. In yet other embodiments of the present invention, host device 10 may receive notification message 44 for only the first guest device that has joined the synchronized browsing session. Alternatively, host device 10 may receive notification message 44 for only designated guest devices that have joined the synchronized browsing session, such as those that have been made a priority, friends, or by some other means of designation.

FIG. 2(*c*) illustrates an exemplary embodiment of the visual output on host device 10 of a third party website including activation hyperlink 51. FIG. 2(*c*) illustrates third party website 50, comprising activation hyperlink 51.

Third party website 50 is an exemplary internet website or application comprising activation hyperlink 51. In the present embodiment, third party website 50 is an exemplary publication mechanism for delivering activation hyperlink 51 to a public audience. However, other methods of publication of activation hyperlink 51 are available, and discussion of these embodiments should in no way limit the interpretation or scope of the present invention.

Third party website 50 allows for a user of host device 10 to initiate a synchronized browsing session by clicking activation hyperlink 51. For example, the publisher of third party website 50 may decide to publish activation hyperlink 51 to increase viewership of their website, because activation hyperlink 51 allows for the initiation of a synchronized browsing session, which may bring increased, higher converting, and more targeted web viewers to third party website 50.

Activation hyperlink 51 is a website or application hyperlink designed to facilitate the initiation process for a synchronized browsing session hosted by host device 10. When activation hyperlink 51 is clicked or activated by host device 10, as described in step 101 and illustrated in FIG. 2(*b*), host device 10 attempts to detect if synchronized browsing software 16 is installed or ready to launch on host device 10. In alternative embodiments of the present invention, software download and installation may not be required. After hyperlink 51 is activated, host device 10 then performs the remainder of the steps in method 100.

Figure 3:
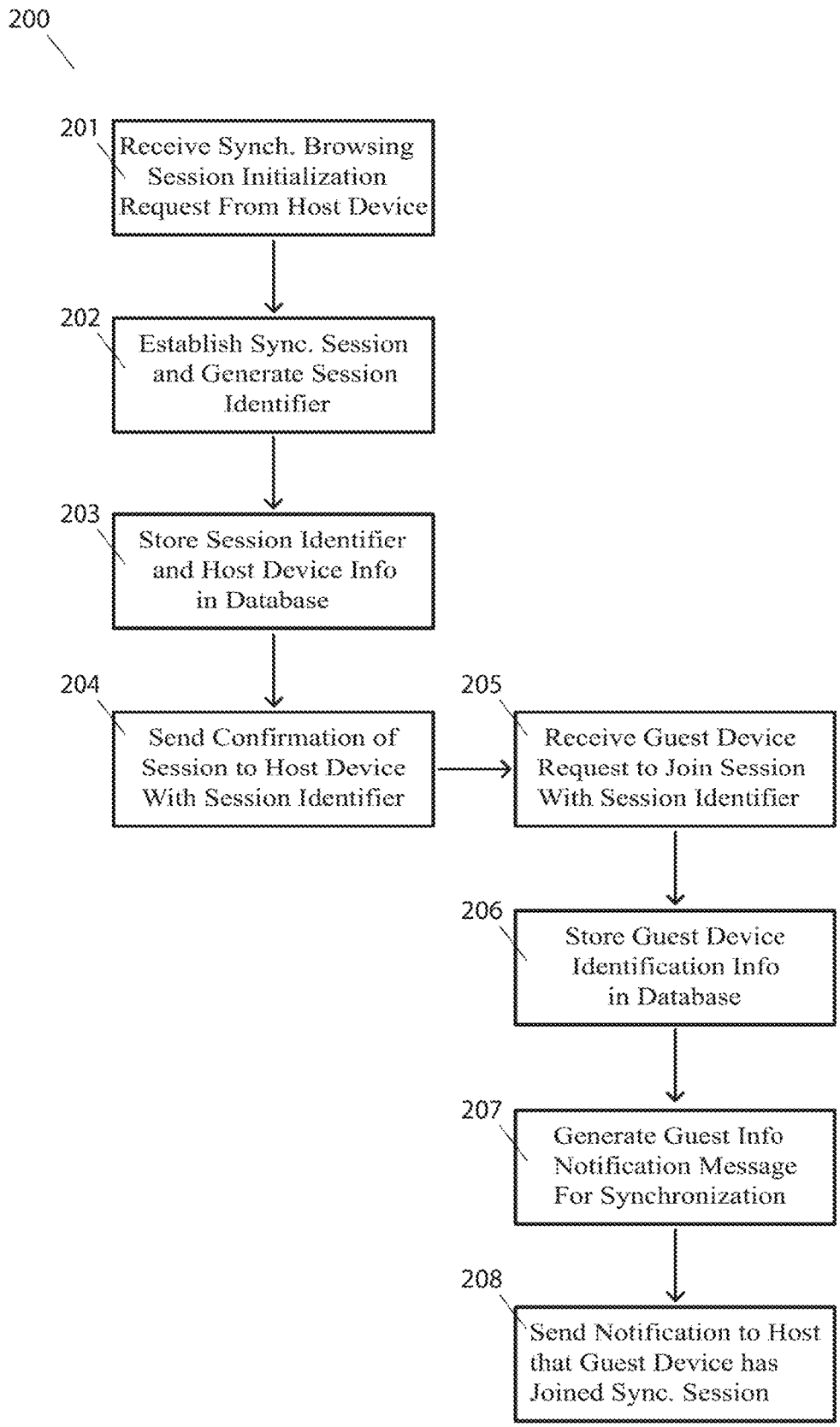
FIG. 3 illustrates a flow chart of a method utilized by a synchronization server for the initialization of a synchronized browsing session

FIG. 3 illustrates a flow chart of method 200 utilized by synchronization server 13 for the initialization of a synchronized browsing session. Method 200 is utilized by synchronization server 13 to initialize a synchronized browsing session between host device 10 and guest device 14. Method 200 is explained in the order shown in FIG. 3; however, the following steps may be taken in any other conceivable sequence without deviating from the scope of the present invention.

In step 201, synchronization server 13 receives initialization request 40 from host device 10, as previously discussed and illustrated in FIGS. 2(a) and 2(b). In step 202, synchronization server 13 establishes a synchronized browsing session, hosted by host device 10, and generates session identifier 19. In step 203, synchronization server 13 records session identifier 19 and the routing information of host device 10 within session identification database 30.

In step 204, synchronization server 13 transmits confirmation message 41 to host device 10, confirming the establishment of the synchronized browsing session, wherein confirmation message 41 includes the transmittal of session identifier 19 to host device 10.

In step 205, synchronization server 13 may receive request to join 43 from a prospective guest device, such as guest device 14. In exemplary embodiments, request to join 43 comprises a data communication requesting to join the synchronized browsing session, wherein the communication includes session identifier 19. In step 206, in response to receiving request to join 43, synchronization server 13 records the routing and identification information of guest device 14 within session identification database 30 in association with session identifier 19, such that synchronization server 13 may later relay synchronized browsing information sent from host device 10 to guest device 14.

In steps 207 and 208, synchronization server 13 generates and transmits notification 44 to host device 10, wherein notification 44 comprises a confirmation message that guest device 19 has joined the synchronized browsing session. In exemplary embodiments, notification 44 comprises the identification information of guest device 19.

Figure 4A:
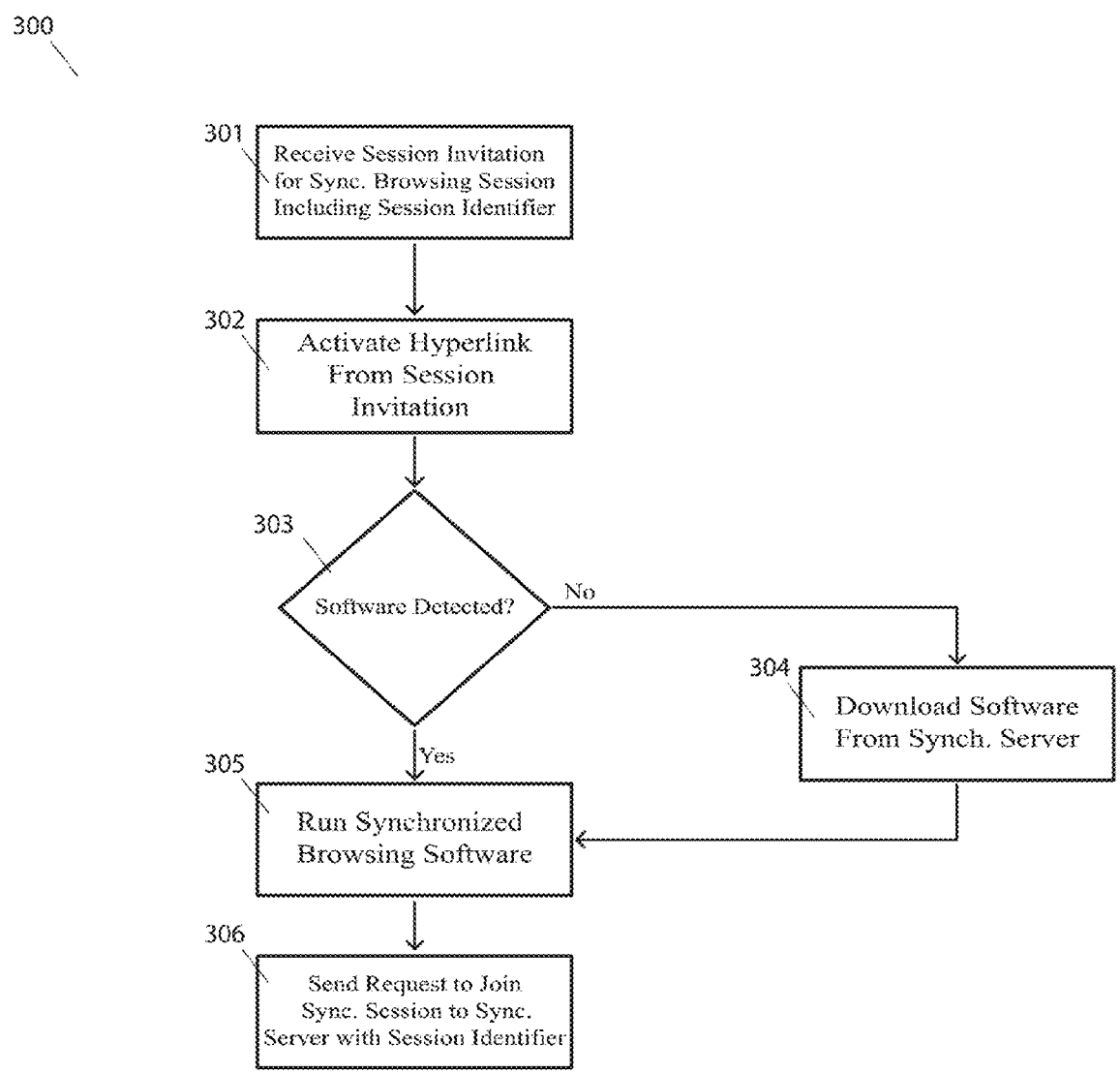
FIG. 4(a) illustrates a flow chart of a method utilized by an invited device for the acceptance and joining of a synchronized browsing session.

FIG. 4(a) illustrates a flow chart of method 300 utilized by invited, prospective, and guest devices for the acceptance and joining of a synchronized browsing session. Method 300 is utilized by a device, such as guest device 14, to accept and join a synchronized browsing session by activating invitation hyperlink 52 (illustrated in FIGS. 4(b)-4(e)). Method 300 is explained in the order shown in FIG. 4(a); however, the following steps may be taken in any other conceivable sequence without deviating from the scope of the present invention.

In step 301, guest device 14 receives session invitation 42, comprising invitation hyperlink 52 and session identifier 19. Session invitation 42, as illustrated in FIGS. 4(b)-4(e), may comprise, but is not limited to, data communication, such as email, instant message or text, SMS, or a public or private internet posting, such as through social networking, applications, blogs, virtual world, game or news feeds.

In step 302, guest device 14 activates invitation hyperlink 52. In step 303, guest device 14 detects if synchronized browsing software 16 is installed or ready to launch on guest device 14. In an exemplary embodiment, activation of invitation hyperlink 52 prompts guest device 14 to detect if synchronized browsing software 16 is present and capable of being run. If synchronized browsing software 16 is not installed or ready to launch on guest device 14, guest device 14 proceeds to step 304. If, however, synchronized browsing software 16 is installed or ready to launch on guest device 14, guest device 14 proceeds to step 305. Further, in embodiments wherein synchronized browsing software 16 is not required to participate in a synchronized browsing session, guest device 14 proceeds to step 306.

In step 304, guest device 14 transmits a request to download synchronized browsing software 16 to synchronization server 13. Once guest device 14 has downloaded synchronized browsing software 16 and the software is ready to launch, guest device 14 proceeds to step 305. In step 305, guest device 14 runs or launches synchronized browsing software 16. Finally, in step 306, guest device 14 transmits request to join 43 to synchronization server 13, including session identifier 19.

Figure 4C:
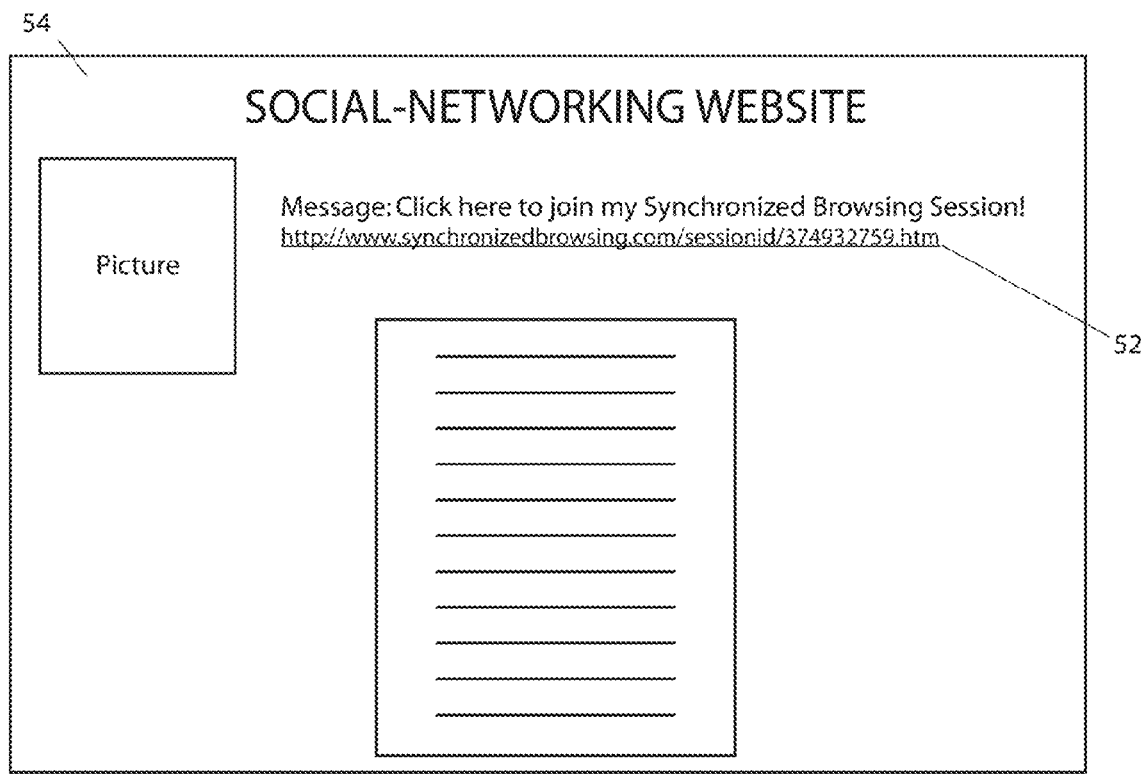
FIG. 4(c) illustrates an exemplary embodiment of the visual output on an invited device for the acceptance of a synchronized browsing session invitation message through a social networking website.
Figure 4D:
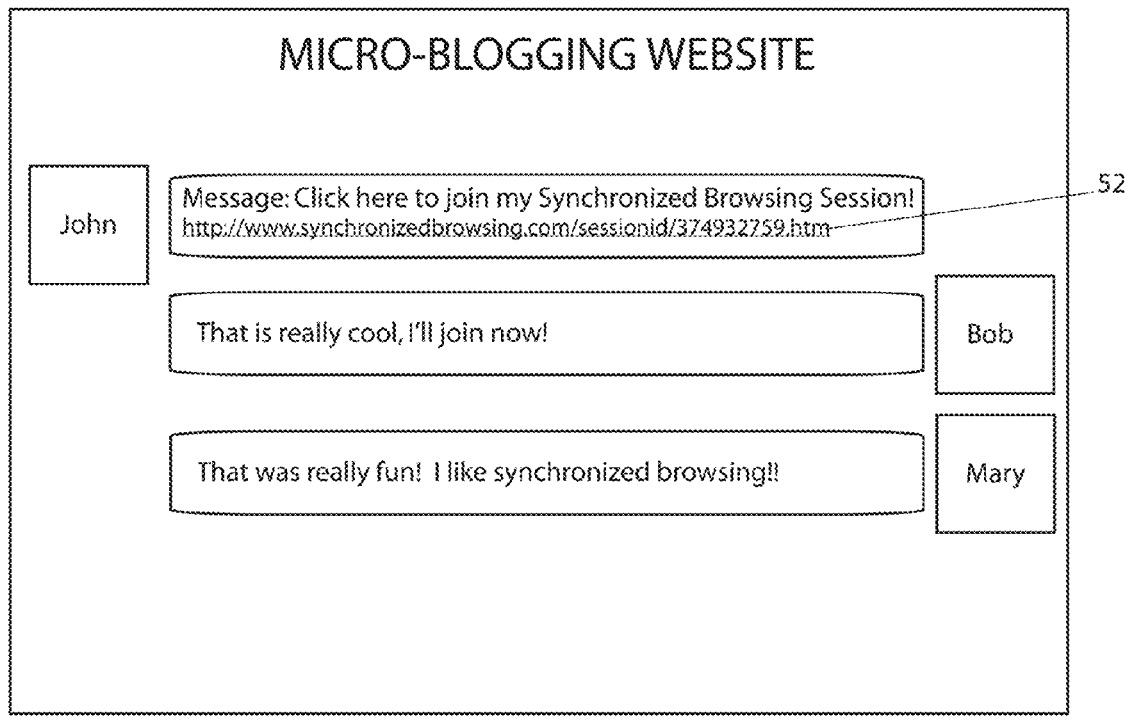
FIG. 4(d) illustrates an exemplary embodiment of the visual output on an invited device for the acceptance of a synchronized browsing session invitation message through a micro-blogging website.
Figure 4E:
FIG. 4(e) illustrates an exemplary embodiment of the visual output on an invited device for the acceptance of a synchronized browsing session invitation message through a news feed website.

FIGS. 4(b)-4(e) illustrate various embodiments of the visual output of an invited, prospective, and/or guest device, such as guest device 14, which has received session invitation 42. FIG. 4(b) illustrates an exemplary embodiment of the visual output on guest device 14 of email message 53, comprising invitation hyperlink 52. FIG. 4(c) illustrates an exemplary embodiment of the visual output on guest device 14 of social networking website 54, comprising invitation hyperlink 52. FIG. 4(d) illustrates an exemplary embodiment of the visual output on guest device 14 of micro-blogging website 55, comprising invitation hyperlink 52. Finally, FIG. 4(e) illustrates an exemplary embodiment of the visual output on guest device 14 of news feed website 56, comprising invitation hyperlink 52.

Invitation hyperlink 52 is a component of session invitation 42, transmitted from host device 10 to guest device 14, via a method such as those illustrated in, but not limited to, FIGS. 4(b)-4(e). In exemplary embodiments, invitation hyperlink 52 comprises a URL address that contains an embedded session ID, such as session identifier 19, for the designated synchronized browsing session. Activation of invitation hyperlink 52 prompts guest device 14 to join the synchronized browsing session, as previously described for FIG. 4(a). In exemplary embodiments of the present invention, activation of invitation hyperlink 52 prompts guest device 14 to launch synchronized browsing software 16. If synchronized browsing software 16 is not installed or ready to launch on guest device 14, activation of invitation hyperlink 52 first prompts guest device 14 to download and launch the software, if such a download is necessary to participate in a synchronized browsing session.

Email message 53, social networking website 54, micro-blogging website 55, and news feed website 56 are various embodiments of means to deliver invitation hyperlink 52 to guest device 14. Email message 53, or in alternative embodiments an instant message, text message, or other form of direct communication, may be sent directly from host device 10 to guest device 14. Alternatively, social networking website 54, micro-blogging website 55 and news feed website 56 allow for prospective guests to join a synchronized browsing session of their friends or people they read or follow, should that person post invitation hyperlink 52. Alternatively, news feed website 56 may comprise a list of invitation hyperlinks 52 for live synchronized browsing sessions that are open to the public, such that a prospective guest may browse the list and join a desired session.

Publicly shared synchronized browsing sessions, such as those that may be linked from news feed website 56, may be open to large groups of people. For example, in an exemplary embodiment where a public figure or other famous person is leading a synchronized browsing session, thousands of their fans may join into the synchronized browsing session, wherein the public figure or a person designated by that figure or their staff may lead followers around to the figures' favorite websites with or without a pre-arranged itinerary or script. Alternatively, such publicly shared synchronized browsing sessions may be utilized for marketing purposes, such that the host of the browsing session may lead their followers to a variety of shopping products. In yet other embodiments, publicly shared synchronized browsing sessions may be utilized for fundraisers, nonprofit organizations, religious groups, educational means, or other like functions.

Complementary to publicly shared synchronized browsing sessions wherein webpage content may be shared, discussed, and interacted with among different groups of people, exemplary embodiments of the present invention may promote means for people of similar interests to connect and share media. These publicly shared synchronized browsing sessions may be driven by individual users who set up and host certain public rooms to discuss and fully interact with online content and other users who share certain interests, demographics, backgrounds, orientations, likes, or dislikes. Further, public rooms may be established to allow users to discuss and fully interact with online content and others about upcoming and current events, certain verticals of content, news, or other experiences. For example, an academy awards public room may comprise a place where people may congregate, discuss, and co-browse webpage content related to the awards presentation. Further, there may be a football public room where users discuss and co-browse online content related to college or professional football.

Alternatively, public rooms may be established where people who share an interest in a public figure, movie, political view, or other subject matter may congregate, discuss, and interact with both the online content and each other. In such embodiments, public rooms may be initialized by either an individual host or may be initialized, maintained or hosted by public sponsors, such as consumer products companies. For example, UNILEVER®, who owns the AXE® brand, may start an "AXE® Public Room" wherein people may congregate, discuss, and co-browse material related to AXE® products or consumer interests and subjects related to AXE® products.

In alternative embodiments, the link and browsing history for these publicly shared sessions, or single user browsing sessions, in general, may be recorded and made available both publicly or privately to users of the present invention. As such, users may view the link histories or favorites lists of other users so that they are enabled to visit one or more of the sites or applications visited in the link history or favorites at a later point in time. For example, if a certain public figure wanted to publish their browsing history or favorites via the invention and other users wanted access to that browsing history or favorites list, the invention would enable these users to view both the lists and to activate those sites directly. In either case, the sites would be similarly complemented with certain adcodes or other identifiers that would track or recognize that particular user back to the holder of that adcode or other identifier once a user visits that site, advertisement, game, virtual world, or application via that link.

Figure 5A:
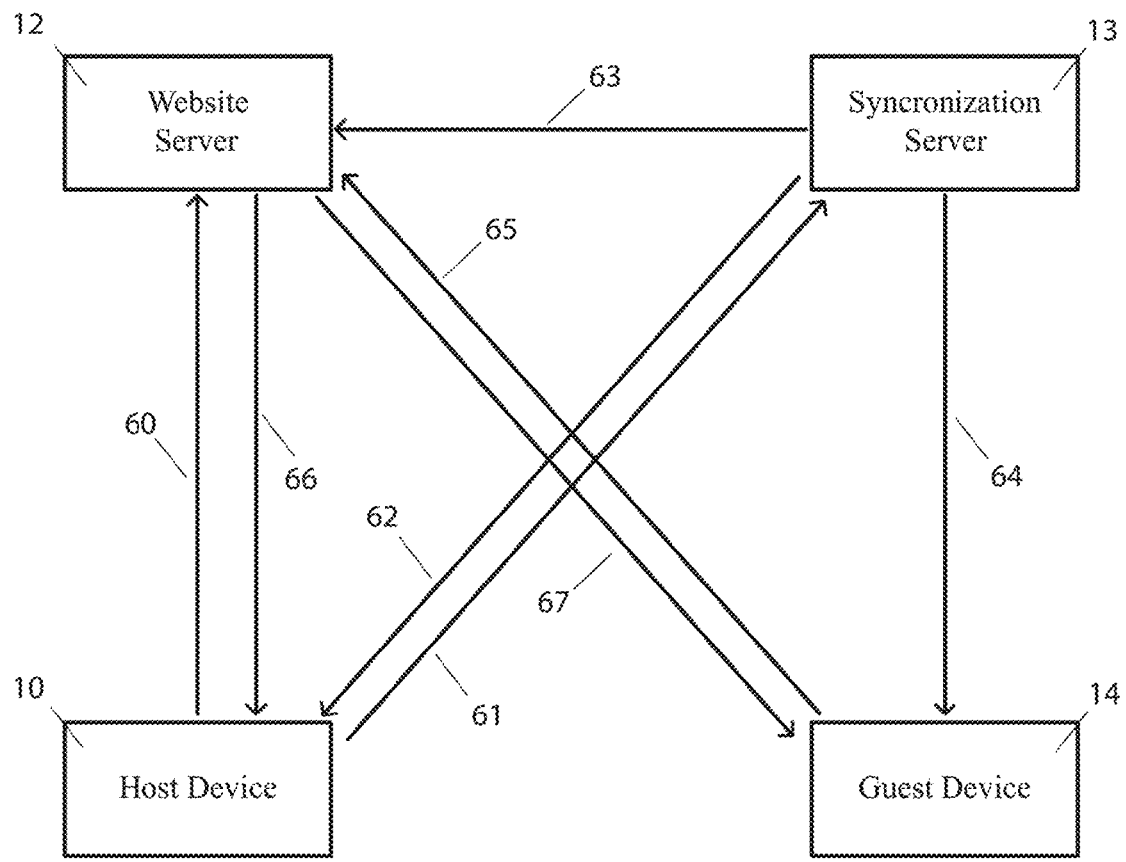
FIG. 5(a) illustrates a block diagram of exemplary data communication transferred between exemplary components of the present invention during a synchronized browsing session.

FIG. 5(a) illustrates a block diagram of exemplary data communication transferred between components of the present invention during a synchronized browsing session. FIG. 5(a) shows host device 10, website server 12, synchronization server 13 and guest device 14 transmitting data communication for a synchronized browsing session.

As previously discussed, host device 10 may initialize and conduct a synchronized browsing session through communication with synchronization server 13. During a synchronized browsing session, host device 10 may transmit website request 60 to website server 12. In an exemplary embodiment, website request 60 is a data communication message sent to request webpage content at a designated location, such as website server 12. For example, website request 60 sent to the United States Patent and Trademark Office ("USPTO") webpage, www.uspto.gov, would comprise a message sent to request website data content at the USPTO's webpage www.uspto.gov.

Typically, in response to website request 60 sent by host device 10, website server 12 will send website content reply 66 to host device 10. In exemplary communication, website content reply 66 comprises the website content requested in website request 60. For example, should website request 60 be sent to www.uspto.gov, website content reply 66 may comprise the data necessary to view the website at www.uspto.gov.

During an exemplary synchronized browsing session, after host device 10 transmits website request 60 to website server 12, host device 10 transmits communication message 61 to synchronization server 13. Communication message 61 may comprise the URL address of website server 12, cookie information, form data, java script, or other user inputted information, or attached files. In alternative embodiments, communication message 61 may further comprise information indicating whether the webpage interaction information is to be relayed to guest device 14. In such embodiments, synchronization server 13 will not relay the webpage interaction information to guest device 14.

In response to communication message 61, synchronization server 13 may transmit reply message 62. In an exemplary embodiment, reply message 62 may comprise an adcode identification code, adcode, XML, or other unique identifier related to the website of URL address contained in communication message 61. In other embodiments of the present invention, reply message 62 may comprise a modified URL address, or webpage interaction information.

Affiliation message 63 is a communication sent by synchronization server 13 to website server 12 in order to update website server 12 with the relevant adcode, cookie, script, or other unique identifier related to the existing partnership or affiliation. In an exemplary embodiment of the present invention, synchronization server 13 may transmit affiliation message 63 to website server 12, wherein affiliation message 63 comprises the routing information of host device 10 and the related adcode or unique identifier, thereby allowing website server 12 to update the browsing session of host device 10.

Communication message 64 is designed to be forwarded by synchronization server 13 to guests in the synchronized browsing session, such as guest 14, to perform the synchronized browsing session. In exemplary embodiments, communication message 64 may be a duplicate of website request 60, or may comprise the URL address of website server 12. In other embodiments, communication message 64 may also include other transmitted data from website request 60, such as cookie information, form data, java script, or other user inputted information, or attached files.

In yet further embodiments of the present invention, communication message 64 may comprise a modified URL address including an adcode or other unique identifier, such that later transmittal to website server 12 may indicate the existence of an affiliation or partnership between the designated website and synchronization server 13. In such embodiments, communication message 64 may include an adcode, adcode identification code, XML, or other unique identifier that is similar or identical to the identifier transmitted in reply message 62.

After host device 10 transmits communication message 61 to synchronization server 13, synchronization server 13 forwards communication message 64 to guest devices.

In the present embodiment illustrated in FIG. 5(a), synchronization server 13 forwards communication message 64 to guest device 14. Communication message 64 may be used by guest device 14 to formulate website request 65 to be sent from guest device 14 to website server 12. Website request 65 is a data communication message transmitted by guest device 14 to website server 12. In exemplary embodiments, website request 65 should be similar or identical to website request 60.

Form data may be defined as information inputted by a user in pre-defined fields on a webpage that may be transmitted to a website server. Website request 60 may include form data inputted by the user of host device 10. For example, should the user of host device 10 search a website for hotel vacancies in New York City on a specified date, website request 60 would include form data for data fields such as location, data of travel, number of nights, number of guests, and other query fields. As such, in exemplary embodiments of the present invention, because communication message 61 may be a duplicate of website request 60, communication message 61 may include the same form data as to that inputted by the user of host device 10 on the hotel reservation website. Form data may also include, but is not limited to, user name, email, password information, search queries, and/or other entry fields that may be inputted by host or guest.

Without the transfer of form data or other types of user input information, should website request 60 sent by host device 10 to website server 12 include any user input, website request 65 may be wholly different than website request 60. In such embodiments, website content reply 66 may be wholly different than that of website content reply 67. For example, in an embodiment wherein form data is not relayed by synchronization server 13 to guest device 14, should host device 10 input hotel reservation information at a hotel or travel website, host device 10 will receive search results relevant to that hotel reservation. Guest device 14, however, may not receive the same search results because guest device 14 was not forwarded the form data to transfer to the hotel website and, as a result, the received search results may not be based upon the same input information.

In exemplary embodiments, website request 65 is identical to website request 60 such that website content reply 67, the data content sent by website server 12 in response to website request 65, is similar or identical to website content reply 66. As such, in a synchronized browsing session between host device 10 and guest device 14, audio and visual output of shared browsing window 17 on guest device 14 is similar or identical to that on host device 10 unless personalization settings, such as private cookie information, are triggered for one of the devices on the site.

Figure 5B:
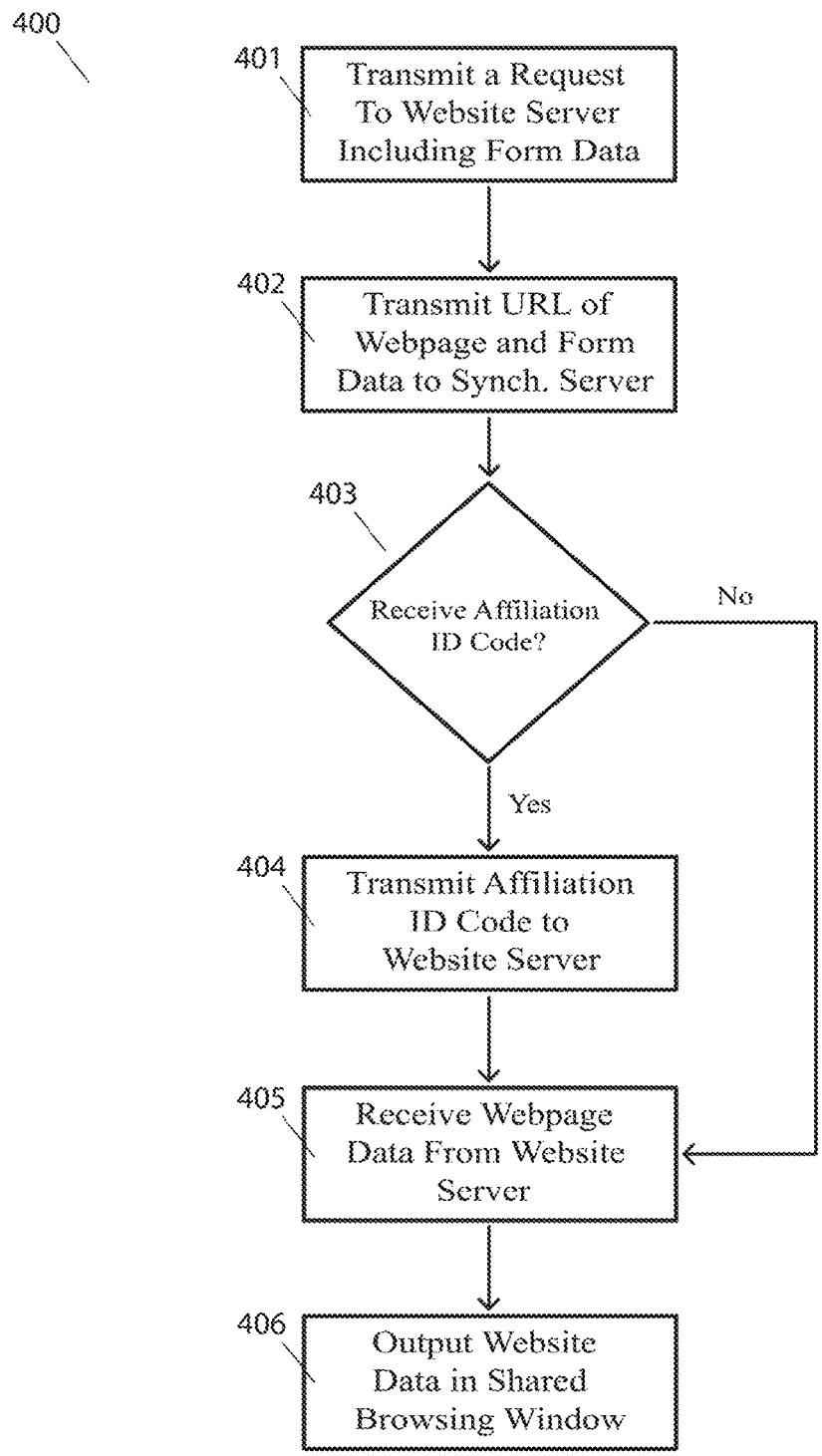
FIG. 5(b) illustrates a flow chart of a method utilized by a host device for the execution of a synchronized browsing session.

FIG. 5(b) illustrates a flow chart of method 400 utilized by host device 10 for the execution of a synchronized browsing session. Method 400 is utilized by host device 10 after a synchronized browsing session has been established. Method 400 is explained in the order shown in FIG. 5(b); however, the following steps may be taken in any other conceivable sequence without deviating from the scope of the present invention.

In step 401, host device 10 transmits website request 60, as previously described, to website server 12. In step 402, host device 10 transmits communication message 61 to synchronization server 61. In an exemplary embodiment of the present invention, communication message 61 may comprise the URL of the website requested, such as the URL for website server 12, form data inputted by the user of host device 10, java script, or other data. Additionally, communication message 61 may comprise any cookie data communication applicable to website request 60.

In step 403, host device 10 awaits a response from synchronization server 13 regarding affiliation with the website hosted on website server 12. If host device 10, via network interface 21, receives an affiliation identification code from synchronization server 13, host device 10 proceeds to step 404. If, however, host device 10 does not receive an affiliation identification code from synchronization server 13, host device 10 proceeds to step 405.

In step 404, host device 10 after receiving an affiliation identification code from synchronization server 13, host device 10 transmits the affiliation identification code to website server 12. In exemplary embodiments, the affiliation identification code is used as a unique browsing session identifier for host device 10 while browsing upon website server 12. In such embodiments, the affiliation identification code may be used to modify the URL address.

In step 405, host device 10 receives website content reply 66 from website server 12. Finally, in step 406, host device 10 outputs webpage content reply 66 via user interface 23 to the user of host device 10 within shared browsing window 17 in synchronized browsing software 16. In alternative embodiments wherein synchronized browsing software 16 is not required, host device 10 may output webpage content reply 66 via user interface 23 within a standard internet browser, or other compatible browsing software.

Figure 5C:
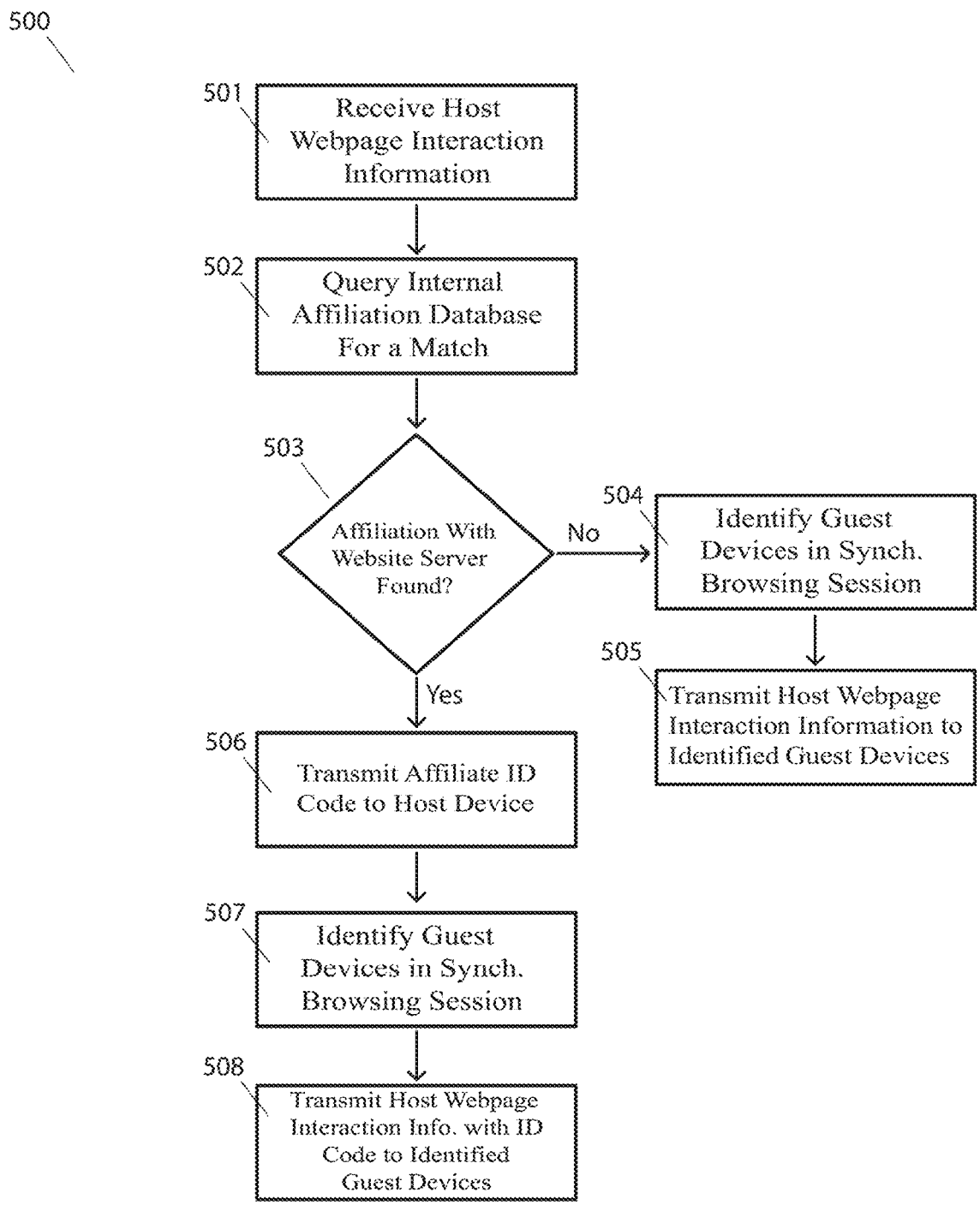
FIG. 5(c) illustrates a flow chart of a method utilized by a synchronization server for the execution of a synchronized browsing session between a host device and one or more guest devices.

FIG. 5(c) illustrates a flow chart of method 500 utilized by synchronization server 13 for the execution of a synchronized browsing session between a host device and one or more guest devices. Method 500 is utilized by synchronization server 13 to facilitate the execution of a synchronized browsing session between host device 10 and guest devices, such as guest device 14. Method 500 is explained in the order shown in FIG. 5(c); however, the following steps may be taken in any other conceivable sequence without deviating from the scope of the present invention.

In Step 501, synchronization server 13 receives communication message 61 from host device 10. As previously described, communication message 61 includes webpage interaction information, such as a URL address, form data, java script, cookies, or other data communication. In Steps 502 and 503, synchronization server 13 queries affiliate database 31 to check if the webpage hosted by website server 12 has an affiliation or partnership agreement with synchronized browsing. In exemplary embodiments of the present invention, synchronization server 13 analyzes communication message 61, identifies the URL address of the webpage contacted by host device 10, and checks for a match within affiliate database 31. In other embodiments, synchronization server 13 may query website server 12 for meta data or other website information for the purposes of determining if the website is an affiliate in the affiliate database 31.

If an affiliation identification code with the webpage hosted by website server 12 is not found, synchronization server 13 proceeds to step 504. If, however, an affiliation identification code with the webpage hosted by website server 12 is found within affiliate database 31, synchronization server 13 proceeds to step 506.

In step 504, synchronization server 13 identifies guest devices that have joined the synchronized browsing session, such as guest device 14. In an exemplary embodiment, synchronization server 13 queries session identification database 30 utilizing session identifier 19, extracting routing information, or other unique information, for guest devices in the synchronized browsing session. In step 505, synchronization server 13 transmits communication message 64 to guest device 14.

In step 506, synchronization server 13 transmits the affiliation identification code found affiliate database 31 to host device 10. In step 507, like in step 504, synchronization server 13 identifies guest devices that have joined the synchronized browsing session, such as guest device 14. Finally, in step 508, synchronization server 13 transmits communication message 64 and the affiliation identification code from affiliate database 31 to guest device 14. In alternative embodiments, synchronization server 13 may modify communication message 64 to include the affiliation identification code.

Figure 5D:
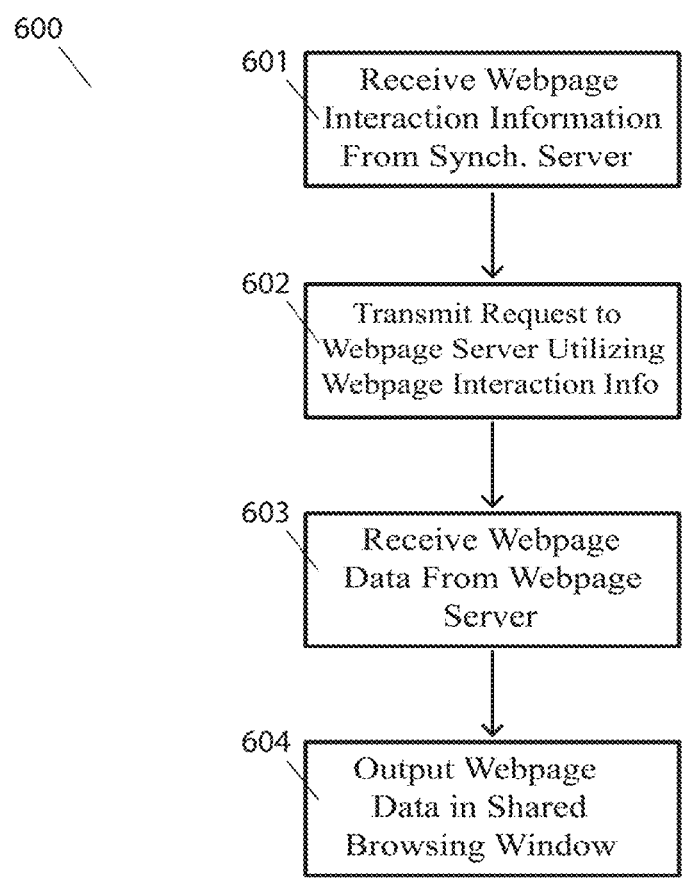
FIG. 5(d) illustrates a flow chart of a method utilized by a guest device for the execution of a synchronized browsing session with a host device.

FIG. 5(d) illustrates a flow chart of method 600 utilized by guest device 14, for the execution of a synchronized browsing session with host device 10. Method 600 is utilized by guest device 14 to facilitate a synchronized browsing session with host device 10. Method 600 is explained in the order shown in FIG. 5(d); however, the following steps may be taken in any other conceivable sequence without deviating from the scope of the present invention.

In step 601, guest device 14 receives communication message 64 from synchronization server 13, as previously described. In step 602, guest device 14 transmits website request 65 to website server 12. As previously described, website request 65 is a data communication message sent to request web content at a designated URL location, such as website server 12, and is similar or identical to website request 60 sent by host device 10. Guest device 14 formulates website request 65 by processing communication message 64. In exemplary embodiments, information in communication message 64, including URL, form data, cookies or other data, is transmitted in website request 65.

In step 603, guest device 14 receives content reply 67 from website server 12. Finally, in step 604, guest device 14 outputs content reply 67 via user interface 27 to the user of guest device 14 within shared browsing window 17 in synchronized browsing software 16. In alternative embodiments wherein synchronized browsing software 16 is not required, guest device 14 may output webpage content reply 67 via user interface 27 within a standard internet browser window or other compatible software. In exemplary embodiments, because website request 65 is similar or identical to website request 60, audio and visual output of content reply 67 is similar or identical to audio and visual output of content reply 66 unless one or more of the users has already registered with that site and certain personalization settings are triggered for that user at that site in which case the rendered site would also include those settings within the context of the requested site.

Figure 6A:
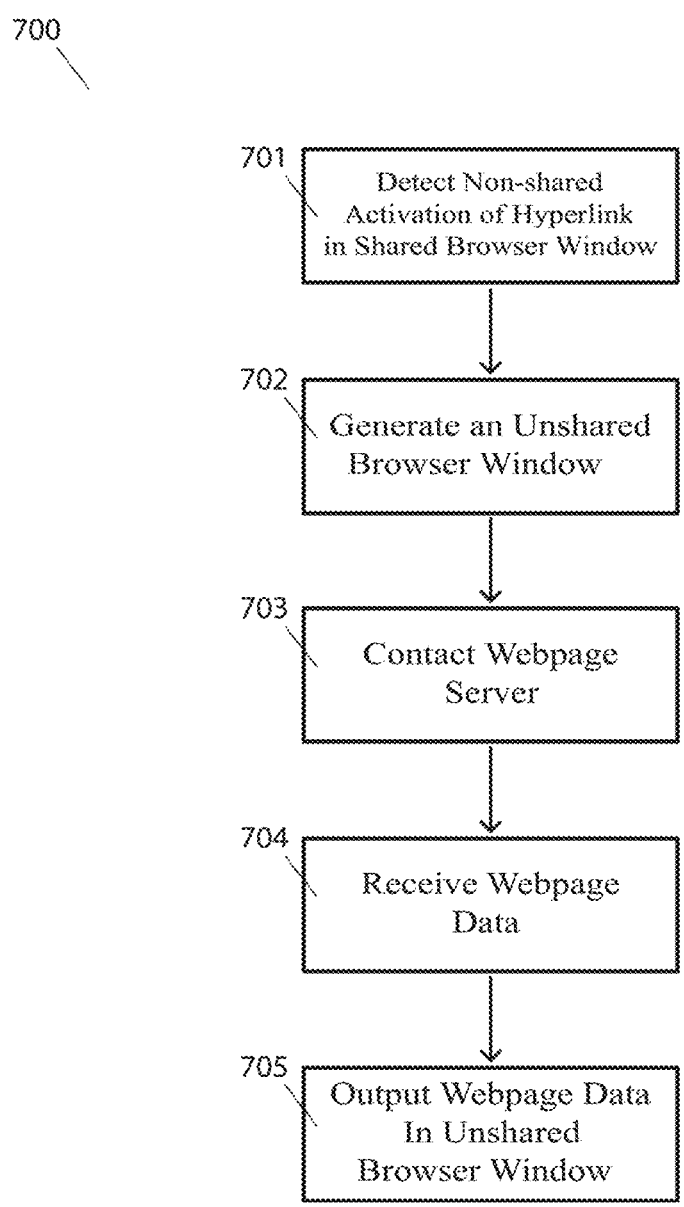
FIG. 6(a) illustrates a flow chart of a method for the utilization of tabbed browsing within a synchronized browsing session by a host device.

FIG. 6(a) illustrates a flow chart of method 700 for the utilization of tabbed browsing within a synchronized browsing session by a leading device, such as host device 10. Method 700 facilitates unshared browsing in a separate tabbed browsing window during a synchronized browsing session by a leading device. Method 700 is explained in the order shown in FIG. 6(a); however, the following steps may be taken in any other conceivable sequence without deviating from the scope of the present invention.

In step 701, the leading device detects a non-shared activation of a hyperlink in shared browser window 17 of synchronized browsing software 16, or other software capable of performing a synchronized browsing session. In exemplary embodiments of the present invention, shared actions by the leading device within synchronized browsing software 16 prompt the transmission of both website request 60 and communication message 61, as discussed previously. Non-shared action within the synchronized browsing software 16, however, prompts the leading device to proceed to step 702. In exemplary embodiments of the present invention, non-shared activation of hyperlinks in synchronized browsing software 16 may comprise a user click on a unopened or blank non-shared tab, right-click, control-click, "finger or screen" press, or some other form of activation such that the software recognizes the activation as to not be shared with guests in the synchronized browsing session.

In step 702, the leading device generates an unshared browsing window within synchronized browsing software 16. In exemplary embodiments, shared browsing window 17 within synchronized browsing software 16 on the leading device remains unaffected, and any activation within shared browsing window 17 prompts the transmission of both website request 60 and communication message 61 for the synchronized browsing session. Once an unshared browsing window is generated, the leading device proceeds to step 703.

In step 703, the leading device contacts the requested website server, such as website server 12, for the unshared website browsing window. In alternative embodiments of the present invention, the leading device may send communication message 61 to synchronization server 13 for a website affiliation query within affiliation database 31. In such embodiments, communication message 61 may comprise data, an identifier, or some other information to indicate to synchronization server 13 that the webpage interaction information is not to be relayed to the following devices. As such, in response to communication message 61, synchronization server 13 may transmit reply message 62 to the leading device, comprising an affiliation identification code or some other recognizable identifier for the affiliated website.

In step 704, the leading device receives the unshared browsing data. Finally, in step 705, the leading device outputs the unshared browsing data in the unshared browsing window.

Figure 6B:
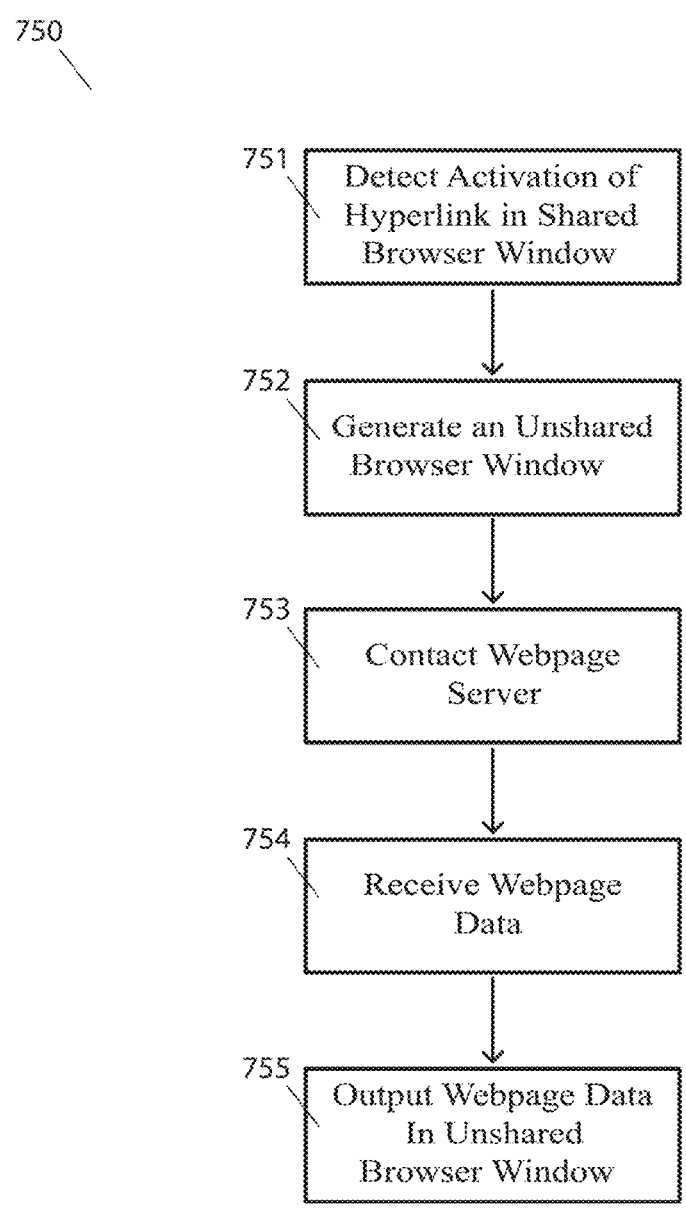
FIG. 6(b) illustrates a flow chart of a method for the utilization of tabbed browsing by a guest device within a synchronized browsing session.

FIG. 6(b) illustrates a flow chart of method 750 for the utilization of tabbed browsing by a following device, such as guest device 14, within a synchronized browsing session. Method 750 facilitates unshared browsing in a separate tabbed browsing window during a synchronized browsing session by a following device that does not possess leading device control of the synchronized browsing session. Method 750 is explained in the order shown in FIG. 6(b); however, the following steps may be taken in any other conceivable sequence without deviating from the scope of the present invention.

In step 751, the following device activates a hyperlink within shared browsing window 17 of synchronized browsing software 16. In exemplary embodiments, any interaction by the user of a following device that is not also a leading device prompts the following device to proceed to step 752.

Step 752-755 of method 750 utilized by the following device are the same as steps 702-705 of method 700 utilized by the leading device. The following device generates an unshared browser window in response to the activation of the hyperlink in step 751. The following device then contacts the website server and receives the requested webpage data. Finally, the following device outputs the unshared webpage data in the unshared browsing window.

In alternative embodiments of the present invention, either leading or following devices may send communication message 61 to synchronization server 13 for a website affiliation query within affiliation database 31 regarding unshared webpage interactions. In such embodiments, communication message 61 may comprise data, an identifier, or some other information to indicate to synchronization server 13 that the webpage interaction information is not to be relayed to other devices. As such, in response to communication message 61, synchronization server 13 may transmit reply message 62 to the querying device, comprising an affiliation identification code for the affiliated website.

Figure 7A:
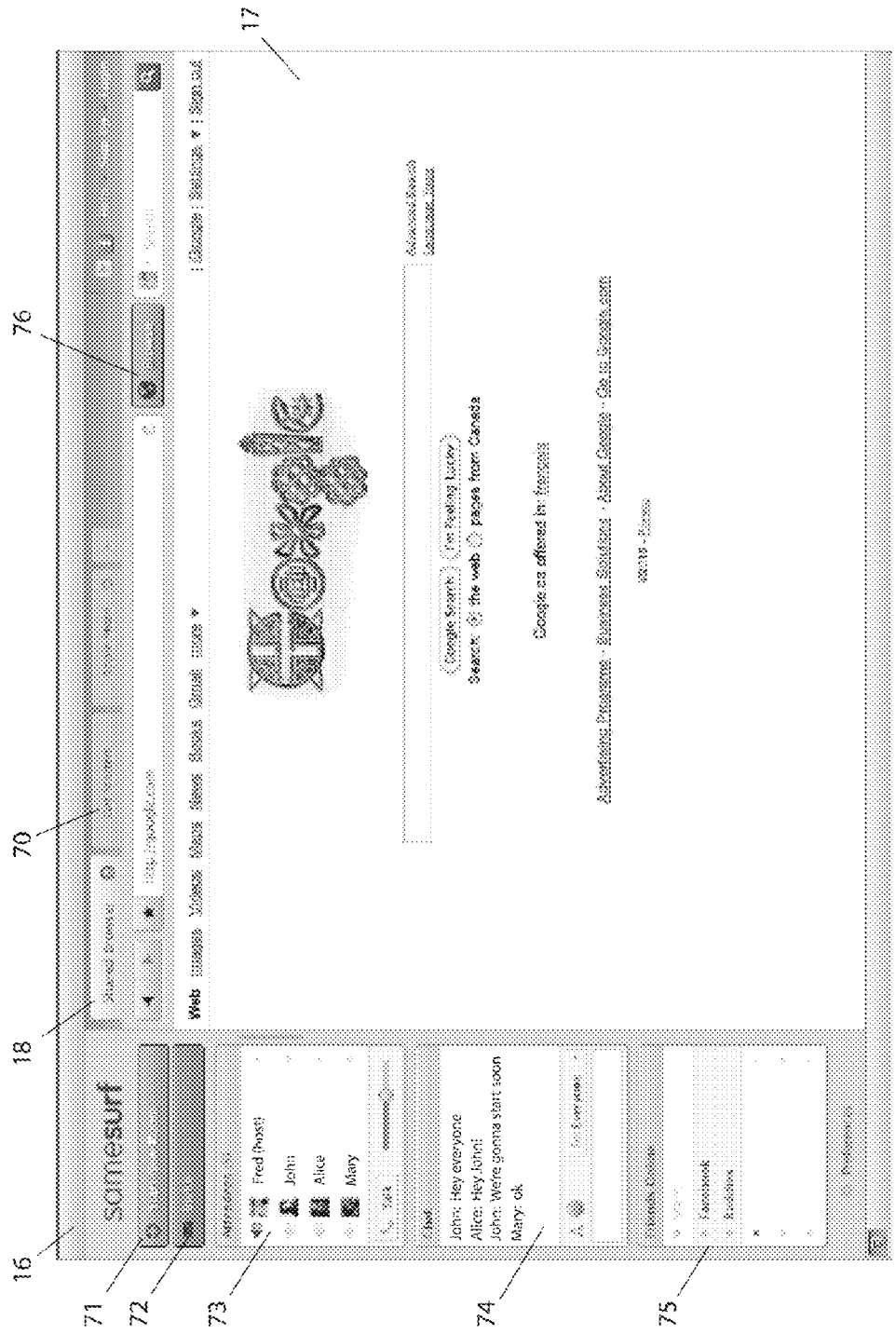
FIG. 7(a) illustrates a screen shot of an exemplary embodiment of synchronized browsing software being run on a host device.

FIG. 7(a) illustrates a screen shot of an exemplary embodiment of synchronized browsing software being run on a host device. FIG. 7(a) illustrates the visual output of host device 10 running synchronized browsing software 16, wherein synchronized browsing software 16 comprises shared browsing window 17, shared browsing tab 18 and unshared browsing tab 70. In various embodiments of the present invention, synchronized browsing software 16 may comprise new room button 71, invitation button 72, attendee list 73, chat box 74, buddy list 75, and browse menu button 76.

Unshared browsing tab 70 is a browsing tab identifier and extension of an unshared browsing window, as described in FIGS. 6(a) and 6(b). New room button 71 is a component of synchronized browsing software 16 that, when clicked or activated by a user, prompts the user to start a new synchronized browsing session. Like activation hyperlink 51, previously discussed for FIG. 2(c), activation of new room button 71 may prompt the user to start a new synchronized browsing session.

Activation of invitation button 72 allows a participant in a synchronized browsing session, whether leading or following, to invite a prospective guest to join the synchronized browsing session. In an exemplary embodiment, activation of invitation button 72 may prompt the user of synchronized browsing software 16 to input a desired recipient of the invitation request. In alternative embodiments, activation of invitation button 72 may allow the user of synchronized browsing software 16 to invite a prospective guest via methods discussed and illustrated in FIGS. 4(b)-4(e).

Attendee list 73 is a component of synchronized browsing software 16 that lists the attendees present in the synchronized browsing session. In alternative embodiments of the present invention, attendee list 73 may only share attendee information with leading devices, such as host device 10, and not following devices, such as guest device 14. In alternative embodiments, however, attendee list 73 may only list known contacts or friends of the user of synchronized browsing software 16. In exemplary embodiments, attendee list 73 may provide visual notification if an attendee has voice chat or video chat capability, or if the attendee has voice chat or video chat enabled.

Further, attendee list 73 may provide the user of synchronized browsing software 16 capability to audibly or visually communicate with individual attendees, groups of attendees, or all attendees of the synchronized browsing session. Additionally, attendee list 73 provides for mute, sound level and other audio and video control capabilities, including options to add, remove, or otherwise disable specific functionality for the user of synchronized browsing software 16. In further embodiments, host device 10 may limit or restrict functionality available to guest devices in synchronized browsing software 16 during a synchronized browsing session. Finally, attendee list 73 also performs other functions such as, but not limited to, enabling users to pass and request controls, banning or ejecting certain users from sessions, audio or text muting certain users, viewing respective profiles for each of the attendees either within the application or on a separate web page, initiating private chat sessions, or other functions.

Chat box 74 is a component of synchronized browsing software 16 that allows attendees of the synchronized browsing session to communicate via text chat. In exemplary embodiments, synchronized browsing software 16 provides functionality to control to whom messages are sent via chat box 74, or which attendees may send and receive messages via chat box 74. Chat box 74 enables users to utilize both textual messages and emoticons that integrate links within them; when these emoticons are selected, clicked, or otherwise triggered, the user will visit the embedded link within a separate non-shared window. These links may also contain advertising, affiliate, or other similar codes that recognize the source of that traffic and give the publisher of that traffic credit for the user's visit to a certain site, game, virtual world, or other application.

Buddy list 75 is a component of synchronized browsing software 16 that provides a list of friends and contacts of the user. In exemplary embodiments, buddy list 75 may incorporate friend lists of the user of synchronized browsing software 16 from AOL®, GMAIL®, MSN®, YAHOO®, FACEBOOK®, or other communication, social networking, and social communication methods and platforms. Buddy list 75 may provide visual notification if a friend or contact listed in buddy list 75 is online, offline, busy, available, or some other status. In exemplary embodiments, activation of a contact in buddy list 75 may provide the user of synchronized browsing software 16 the option to chat, text, communicate, or invite the contact to a synchronized browsing session. Further, synchronized browsing software 16 may integrate social media services from media providers such as FACEBOOK®, TWITTER®, GOOGLE®, and others, to provide social media functionality to the user.

Browse menu button 76 is a component of synchronized browsing software 16 that provides a user access to the browse menu. Activation of browse menu button 76 opens the browse menu of synchronized browsing software 16, which will be discussed for FIG. 7(b).

Figure 7B:
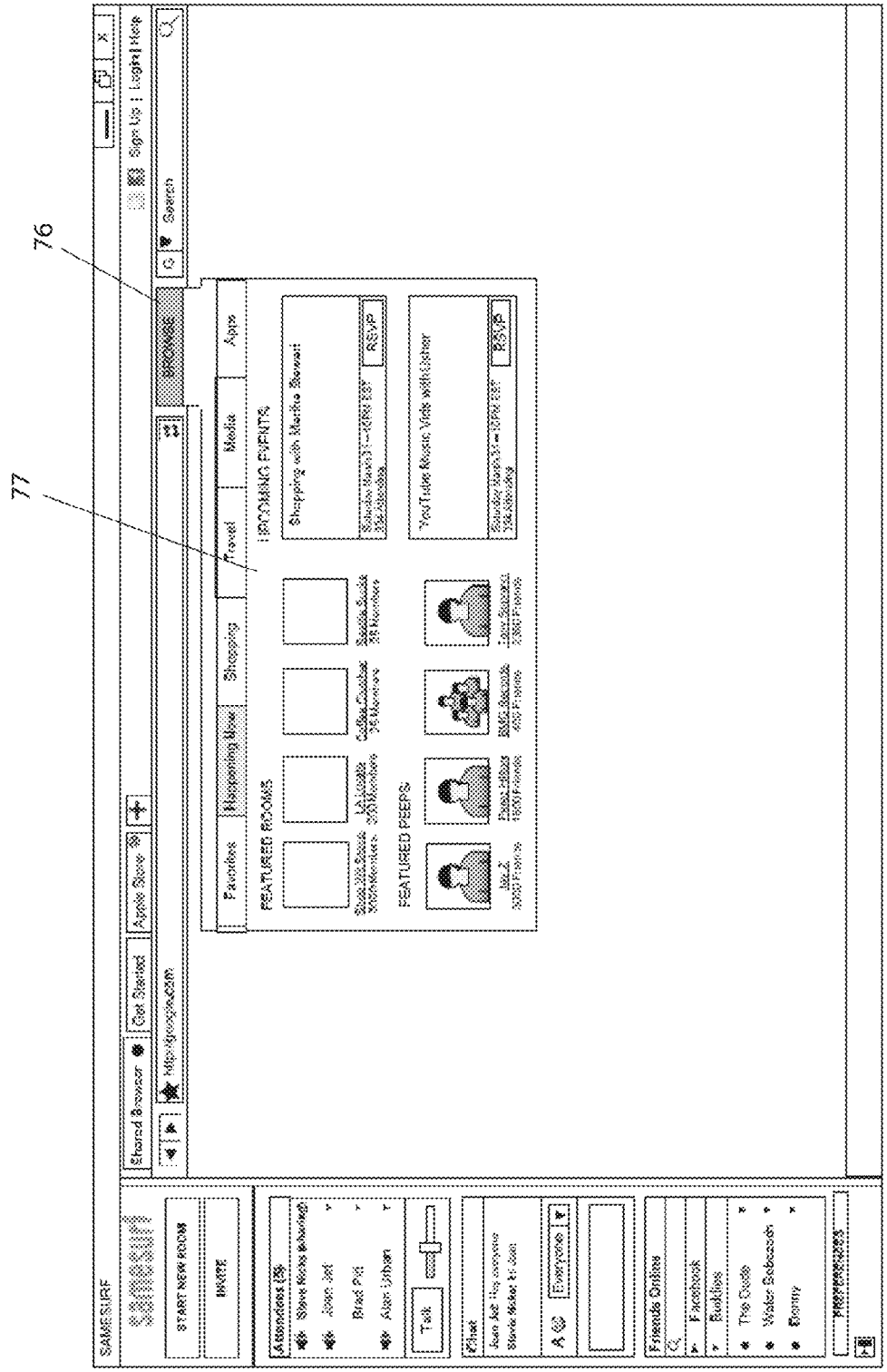
FIG. 7(b) illustrates an exemplary embodiment of synchronized browsing software on a host device highlighting an expanded browse menu.

FIG. 7(b) illustrates an exemplary embodiment of synchronized browsing software on a host device highlighting an expanded browse menu. FIG. 7(b) illustrates browse menu button 76 and browse menu 77.

Browse menu button 76 and browse menu 77 are components of synchronized browsing software 16 that provide the user easy access to a vast amount of information and media. Activation of browse menu button 76 prompts the opening of browse menu 77. In exemplary embodiments, browse menu 77 may include tabbed windows of content. In the embodiment illustrated in FIG. 7(b), the tabs include "favorites," "happening now," "shopping," "travel," "media," and "apps." Alternatively, the tabbed windows may separate internet content by theme, alphabetically, or by some other sorting method. In yet other embodiments, the tabs may be editable, such that a user may sort content according to their preferences.

Browse menu 77 may provide access to featured and publicly shared synchronized browsing sessions. Further, browse menu 77 may inform the user of synchronized browsing software 16 of upcoming events, promotions, and other information. Additionally, a user may sign up, or rsvp, to a synchronized browsing session via browse menu 77.

A method and apparatus for the implementation of a real-time, sharable browsing experience on a guest device has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A method performed by a guest device for joining a synchronized browsing session administered by a synchronization server, comprising:
   receiving from the synchronization server a session invitation including a session identifier associated with a host device;

activating the session invitation to send a request to join said synchronized browsing session to said synchronization server;

receiving web browsing interaction data from said synchronization server, wherein said web browsing interaction data is associated with:
  a website server that is independent of the synchronization server, and
  the host device that has initiated the session invitation; and operating an application based on said web browsing interaction data received from said synchronization server to access a website server independent of the synchronization server subsequent to the activation of the session invitation.

2. The method of claim 1, wherein said invitation comprises a hyperlink associated with said synchronized browsing session.

3. The method of claim 1, wherein said invitation is received via a viable means of communication.

4. The method of claim 1, wherein said web browsing interaction data further comprises cookie information associated with the website server.

5. The method of claim 4, wherein said web browsing interaction data further comprises information related to shared user input web browsing interactions depicted in a first web browser window.

6. The method of claim 5, wherein non-shared web browsing interactions are depicted in a second web browser window.

7. The method of claim 1, wherein said web browsing interaction data further comprises form data associated with the website server.

8. The method of claim 1, wherein said web browsing interaction data further comprise a log-in into a restricted access webpage.

9. A guest device for performing a synchronized browsing session administered by a synchronization server, comprising:
  a network interface adapted to communicate with said synchronization server; and
  a processor configured to:
    receive from the synchronization server a session invitation including a session identifier associated with a host device;
    activate the session invitation to send a request to join said synchronized browsing session to said synchronization server via said network interface;
    receive web browsing interaction data from said synchronization server, wherein said web browsing interaction data is associated with:
      a website server that is independent of the synchronization server, and
      the host device that has initiated the session invitation; and
    operate an application based on said web browsing interaction data received from said synchronization server to access the website server that is independent of the synchronization server subsequent to the activation of the session invitation.

10. The apparatus of claim 9, further comprising a memory adapted to store one or more software modules for controlling said processor.

11. The apparatus of claim 9, wherein said invitation comprises a hyperlink associated with said synchronized browsing session and said hyperlink is received from the host device via a viable means of communication.

12. The apparatus of claim 11, further comprising a user interface adapted to initiate said processor to send said request in response to a user input.

13. The apparatus of claim 12, wherein said user input comprises activation of said hyperlink for initializing sending of said request to join said synchronized browsing session.

14. The apparatus of claim 9, further comprising a user interface adapted to depict shared user input web browsing interactions in a shared web browsing window.

15. The apparatus of claim 14, wherein information related to said shared user input web browsing interactions comprises web browsing interaction data.

16. The apparatus of claim 14, wherein said shared user input web browsing interactions further comprise a log-in into a restricted access webpage.

17. The apparatus of claim 14, wherein said shared user input web browsing interactions are depicted in a first web browser window.

18. The apparatus of claim 17, wherein non-shared web browsing interactions are depicted in a non-shared web browser window.

* * * * *